(12) United States Patent
Yamakawa et al.

(10) Patent No.: US 7,389,362 B2
(45) Date of Patent: Jun. 17, 2008

(54) PERIPHERAL EQUIPMENT CONTROL PROGRAM, PROGRAM CONTROL DEVICE, PROGRAM CONTROL METHOD, PERIPHERAL EQUIPMENT DRIVER, PERIPHERAL EQUIPMENT CONTROL DEVICE, AND METHOD FOR INSTALLING PERIPHERAL EQUIPMENT CONTROL DRIVER

(75) Inventors: Tomoe Yamakawa, Saitama (JP); Yoshiyuki Yoda, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 587 days.

(21) Appl. No.: 10/936,604

(22) Filed: Sep. 9, 2004

(65) Prior Publication Data
US 2005/0200873 A1 Sep. 15, 2005

(30) Foreign Application Priority Data
Mar. 12, 2004 (JP) ............................. 2004-070916
Mar. 22, 2004 (JP) ............................. 2004-082793

(51) Int. Cl.
*G06F 13/10* (2006.01)
(52) U.S. Cl. ............................. 710/8; 710/62; 710/63
(58) Field of Classification Search ...................... None
See application file for complete search history.

(56) References Cited

U.S. PATENT DOCUMENTS 6,804,019 B2 * 10/2004 Shiohara .................... 358/1.15

2003/0090694 A1 * 5/2003 Kennedy et al. ........... 358/1.13

FOREIGN PATENT DOCUMENTS

| JP | 7-311663 | 11/1995 |
| JP | 2000-137593 | 5/2000 |
| JP | A 2001-202321 | 7/2001 |

* cited by examiner

*Primary Examiner*—Ilwoo Park
(74) *Attorney, Agent, or Firm*—Oliff & Berridge, PLC

(57) ABSTRACT

Peripheral equipment control program, program control device, program control method, peripheral equipment driver, peripheral equipment control device, and method for installing peripheral equipment control driver are disclosed. A peripheral equipment control program stored in an information processing device connected to a peripheral equipment, causes a computer to carry out processing for requesting a file which describes software specific to the peripheral equipment, of the peripheral equipment; processing for storing and holding the file transmitted from the peripheral equipment on the request; processing for activating the software on the basis of the stored and held file; when data which the peripheral equipment is requested to process is received from an application stored in the information processing device, processing for requesting the software to create job data on the basis of the received data; and processing for transmitting the job data which the software has created on the basis of the data, to the peripheral equipment.

12 Claims, 20 Drawing Sheets

```
FUNCTION_INFO{                                      49

TCHAR            strFuncName;      //FUNCTION NAME STORING
                                         REGION CDM_SEL_METHOD   wSelMethod;       //FORM OF CHOICES WORD             wItemNum;         //NUMBER OF CHOICES

}

SELECT_ITEM{

TCHAR            strItemName;      //CHOICE NAME STORING REGION

CDM_SEL_METHOD   idDevmode;        //CORRESPONDING Devmode ID

WORD             dwValue;          //PARAMETER SET TO Devmode ID

}

SELECT_ITEM{

TCHAR            strItemName;      //CHOICE NAME STORING REGION

CDM_SEL_METHOD   idDevmode;        //CORRESPONDING Devmode ID

WORD             dwValue;          //PARAMETER SET TO Devmode ID

| FUNCTION NAME | CHOICE NAME | PRINTER A | COMPONENT | CORRESPONDING Devmode |
|---|---|---|---|---|
| COLOR MODE | AUTOMATIC | × | C1 | dmColor |
| | COLOR | × | B1 | |
| | BLACK AND WHITE | × | B1 | |
| NUMBER OF COPIES | | 1-9999 | B1 | dmCopies |
| SIZE | B3 | × | B1 | dmPaperSize |
| | A4 | ○ | B1 | |
| | A3 | ○ | B1 | |
| | A5 | ○ | B1 | |
| | B4 | ○ | B1 | |
| | B5 | ○ | B1 | |
| | POSTCARD | ○ | B1 | |
| ORIENTATION OF DOCUMENT | VERTICAL | ○ | B1 | dmOrientation |
| | HORIZONTAL | ○ | B1 | |
| DOCUMENT MIX MODE | 2UP (FWD) | ○ | B2 | dmNup |
| | 4UP (FWD HORIZ.) | ○ | B2 | |
| | 4UP (FWD VERT.) | ○ | B2 | |
| | 8UP (FWD HORIZ.) | ○ | B2 | |
| | 8UP (FWD VERT.) | ○ | B2 | |
| 180-DIGREE IMAGE TURN | ON | ○ | B3 | dmRotate |
| IMAGE QUALITY ADJUSTMENT | TONER SAVING | × | C2 | dmEconoMode |
| | OHP ORIENTATION | ○ | C2 | dmDoctype |
| | PRESENTATION | × | C2 | |
| STAMP | ONLY INITIAL PAGE | ○ | B4/B5 | wStamp1st |
| | TRANSPARENT | ○ | B4/B5 | wStampTrans |
| IMAGE QUALITY ADJUSTMENT | BRIGHTNESS/CONTRAST | ○ | C2 | wLCC |
| | RGB | × | C3 | wRGB |
| | COLOR TEMPERATURE | × | C3 | wG |
| | GAMMA CORRECTION | × | C3 | wGamma |
| | IMAGE RLE COMPRESSION | ○ | C5 | wCompress |
| | IMAGE DeltaRaw COMPRESSION | × | C6 | |
| | JPEG COMPRESSION | ○ | C7 | |

| | | Document Size | | | Output Size | | | | Two-Sided Printing | | | Paper Tray Selection | | | | Type of Paper | | | | | | | |
|---|---|---|---|---|---|---|---|---|---|---|---|---|---|---|---|---|---|---|---|---|---|---|---|
| | | A4 | A3 | User Defined Size | Document Size | A4 | B5 | User Defined Size | Not to be made | Longer Side Binding | Shorter Side Binding | Automatic *1 | Automatic *2 | Tray 1 | Tray 2 (Optional) | Plain Paper | Woodfree Paper | OHP Film | Thick Paper | Coated Paper | Label Paper | Postcard | Envelope |
| Document Size | A4 | ■ | ■ | ■ | | | | | | | | | | | | | | | | | | | |
| | A3 | ■ | ■ | ■ | | x | | | | | | | | | | | | | | | | | |
| | User Defined Size | ■ | ■ | ■ | ▲ | | | ▲ | | | | x | | x | x | | | | | | | | |
| Output Size | Document Size | x | ▲ | | ■ | ■ | ■ | ■ | | | | | | | | | | | | | | | |
| | A4 | | | | ■ | ■ | ■ | ■ | | | | | | | | | | | | | | | |
| | B5 | | | | ■ | ■ | ■ | ■ | | | | | | | | | | x | | | | | |
| | User Defined Size | | ▲ | | ■ | ■ | ■ | ■ | | | | ▲ | | | | | | x | | | | | |
| Two-Sided Printing | Not to be made | | | | | | | | ■ | ■ | ■ | | | | | | | | | | | | |
| | Longer Side Binding | | | | | | | | ■ | ■ | ■ | | | | | | | x | x | x | x | x | x |
| | Shorter Side Binding | | | | | | | | ■ | ■ | ■ | | | | | | | x | x | x | x | x | x |
| Paper Tray Selection | Automatic *1 | | x | | | | ▲ | | | | | ■ | ■ | ■ | ■ | | | x | x | x | x | x | x |
| | Automatic *2 | | | | | | | | | | | ■ | ■ | ■ | ■ | | | | | | | | |
| | Tray 1 | | x | | | | | | | | | ■ | ■ | ■ | ■ | | | x | x | x | x | x | x |
| | Tray 2 (Optional) | | x | | | | | | | | | ■ | ■ | ■ | ■ | | | x | x | x | x | x | x |
| Type of Paper | Plain Paper | | | | | | | | | | | | | | | ■ | ■ | ■ | ■ | ■ | ■ | ■ | ■ |
| | Woodfree Paper | | | | | | | | | | | | | | | ■ | ■ | ■ | ■ | ■ | ■ | ■ | ■ |
| | OHP Film | | | | | | x | x | | x | x | x | | x | x | ■ | ■ | ■ | ■ | ■ | ■ | ■ | ■ |
| | Thick Paper | | | | | | | | | x | x | x | | x | x | ■ | ■ | ■ | ■ | ■ | ■ | ■ | ■ |
| | Coated Paper | | | | | | | | | x | x | x | | x | x | ■ | ■ | ■ | ■ | ■ | ■ | ■ | ■ |
| | Label Paper | | | | | | | | | x | x | x | | x | x | ■ | ■ | ■ | ■ | ■ | ■ | ■ | ■ |
| | Postcard | | | | | | | | | x | x | x | | x | x | ■ | ■ | ■ | ■ | ■ | ■ | ■ | ■ |
| | Envelope | | | | | | | | | x | x | x | | x | x | ■ | ■ | ■ | ■ | ■ | ■ | ■ | ■ |

*1: WITHOUT MANUAL FEED
*2: WITH MANUAL FEED

FIG. 21

PERIPHERAL EQUIPMENT CONTROL PROGRAM, PROGRAM CONTROL DEVICE, PROGRAM CONTROL METHOD, PERIPHERAL EQUIPMENT DRIVER, PERIPHERAL EQUIPMENT CONTROL DEVICE, AND METHOD FOR INSTALLING PERIPHERAL EQUIPMENT CONTROL DRIVER

FIELD OF THE INVENTION

The present invention relates to a peripheral equipment control program, a program control device, a program control method, a peripheral equipment driver, a peripheral equipment control device, and a method for installing a peripheral equipment control driver, particularly, to a peripheral equipment control program, a program control device, a program control method, a peripheral equipment driver, a peripheral equipment control device, and a method for installing a peripheral equipment control driver which download a file related to the peripheral equipment control program that is stored in a peripheral equipment.

BACKGROUND OF THE INVENTION

Peripheral equipment for use in connection to PCs (personal computers), such as printers, scanners, facsimiles, and copying machines, has been put on the market. Here, when a peripheral equipment is to be used, being connected to a PC, it is necessary to install software, called a driver, for converting the data outputted by application software into a control code which can be interpreted by the peripheral.

With such driver, the function of communicating with a peripheral equipment, and the function of converting the instruction from the OS (an acronym of operating system) of the PC into the control code are constituted by a group of driver files. When the PC uses a peripheral, the PC receives all the related driver files, and by implementing object registration of the peripheral to the OS, makes it operable.

To install a printer driver in the PC, the OS standard install wizard is available or the setup tool is offered by the vendor, and when a single package supports a plurality of models, the user must select the model to be installed and the optional configuration to be provided in the installation operation using such a wizard or a setup tool.

Further, to inform the model name and the optional configuration of the user, some systems broadcast the network connected a peripheral equipment for picking up the model name, while others detect the locally connected a peripheral equipment by the PnP (acronym of plug and play) method.

Japanese patent application publication No. 2001-202321 provides one example; as disclosed in it, a communication method for computer systems that allows the user to connect the computer to a peripheral equipment for operating the peripheral regardless of which of the computer OS and the peripheral was put on sale, and peripherals which are compatible with that communication method are available.

Japanese patent application publication No. 7-311663 provides another example; as disclosed in it, a printer which allows the model name of it to be automatically identified by the computer connected to it, and when the computer is not provided with the printer driver corresponding to the printer, transfers that printer driver to the computer and registers it to the computer is available.

Japanese patent application publication No. 2000-137593 provides still another example; as disclosed in it, an information processing device, an information processing method, an information processing system, a storage medium for storing an information processing program, a delivery device for sending an information processing program, and an information processing program product are available which can automatically configure the user interface for the program to control the peripheral in accordance with the functions acquired from that peripheral.

However, when a peripheral equipment is to be registered, it is mandatory to use the driver file specific to that peripheral, and if the OS is not provided with that driver file, the user must acquire the required driver file.

Further, it is impossible to previously provide the OS with the driver files specific to the peripherals which will be released in the future, thus in most cases, the user must acquire the driver files.

In such a case, the storage medium (or the server PC on the network) which accommodates the driver files must be mounted on the PC, and from it, all the related driver files must be copied on the storage medium, such as a PC local hard disk.

In addition, it is generally required that, when a peripheral equipment is to be registered to the OS, all the related driver files must be arranged in the same local PC before registration.

Further, with the OS standard install wizard or the setup tool by the vendor, the model name of the pertinent peripheral and the optional configuration cannot be acquired, if the power for the peripheral is turned off in the installation of the driver. Still further, when a plurality of model names are listed up, the proper model name may not be identified, and the user is required to inquire an informed manager of the model name and the like, or make an operation, such as consulting the manual for the peripheral to know the model name.

SUMMARY OF THE INVENTION

The present invention has been made in view of the above circumstances and provides a peripheral equipment control program, a program control device, a program control method, a peripheral equipment driver, a peripheral equipment control device, and a method for installing a peripheral equipment control driver which allows the driver corresponding to the model name of the peripheral and the optional configuration to be installed in the PC without the need for the user acquiring the driver file specific to the added peripheral that is required by the OS, and which allows construction of an optimum printing environment using the separately provided driver specific to the peripheral with no need for any effort by the user.

A first aspect of the present invention provides a peripheral equipment control program stored in an information processing device connected to a peripheral equipment, wherein a computer carries out processing for requesting a file which describes software specific to the peripheral equipment, of the peripheral equipment; processing for storing and holding the file transmitted from the peripheral equipment on the request; processing for activating the software on the basis of the stored and held file; when data which the peripheral equipment is requested to process is received from an application stored in the information processing device, processing for requesting the software to create job data on the basis of the received data; and processing for transmitting the job data which the software has created on the basis of the data, to the peripheral equipment.

According to the above configuration, the peripheral equipment control program related to specific processing required for each particular peripheral can be taken out from the pertinent peripheral itself, thus the problem of that the peripheral cannot be used because of the absence of the peripheral equipment control program can be eliminated, and in addition, for the peripherals in the future, only one type of peripheral equipment control program of the present invention is needed, provided that the interface is made compatible with the peripheral equipment control program for the pertinent peripherals in the future.

A second aspect of the present invention provides a peripheral equipment driver stored in an information processing device which is connected to at least one peripheral equipment through a network, and controlling the peripheral equipment, wherein a basic program that meets specifications common to all peripheral equipment is provided, and a computer carries out processing for acquiring a peripheral equipment dependent file comprising a difference program to be added to the basic program held by the peripheral equipment to be connected; a function program corresponding to the function to be supported by the peripheral equipment; and data and a program which are dependent on the peripheral equipment, from the peripheral equipment; processing for adding the acquired peripheral equipment dependent file to the basic program; and processing for registering the basic program to which the peripheral equipment dependent file is added, to the information processing device, as a program which is dependent on the peripheral equipment.

According to the above configuration, the user can use the peripheral immediately after the connection of it, and when the peripheral, such as a printer or a scanner, is installed to form a system together with the PC and the network environment, an environment where the peripheral equipment driver is installed can be offered, if a specific model name of peripheral is not selected.

BRIEF DESCRIPTION OF THE DRAWINGS

Embodiments of the present invention will be described in detail based on the following drawings, wherein:

FIG. 16 is a chart giving an example of the function information structure FunctionInfo 49;

FIG. 19 is a chart giving an example of the function corresponding information 48;

FIG. 20 is a chart giving an example of the main rule interdiction processing matrix 47; and FIG. 21 is a chart giving an example of the graphics interdiction processing matrix 47.

DESCRIPTION OF THE PREFERRED EMBODIMENTS

Hereinbelow, embodiments of the present invention will be specifically described with reference to the accompanying drawings.

As an exemplary embodiment of the present invention, the configuration where an information processing device, such as a PC (personal computer), is connected with a printer, and the peripheral equipment control program (hereafter called the printer driver) corresponding to the printer according to the present invention is installed in the information processing device will be specifically described.

The configuration where an information processing device in which the printer driver corresponding to the printer is locally connected to the printer according to the present invention will be described in detail as a first embodiment of the present invention.

Figure 1:
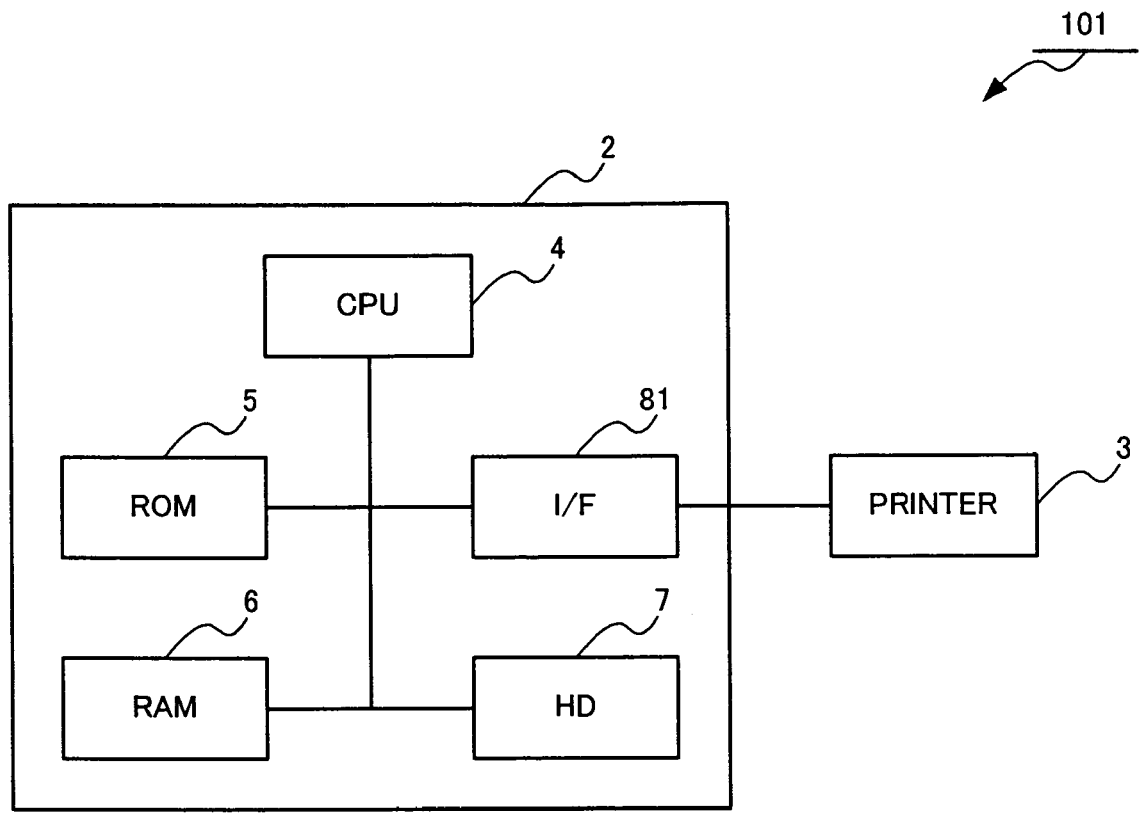
FIG. 1 is a block diagram illustrating an example of the entire configuration of a printing system 101 to be used in the first embodiment of the present invention.

FIG. 1 is a block diagram illustrating an example of the entire configuration of a printing system 101 to be used in the first embodiment of the present invention.

As shown in FIG. 1, an information processing device 2 is locally connected with a printer 3. For local connection, any communication method may be used, regardless of whether it is of wire or radio.

Here, each device will be described in detail.

The information processing device 2 carries out processing of data, using an application program (hereafter called an application) or the like.

The printer 3 carries out processing for forming the printing data received from the information processing device 2 on a paper.

Here, the information processing device 2 will be described in detail.

As shown in FIG. 1, the information processing device 2 comprises a CPU 4, an ROM 5, an RAM 6, an HD 7, and an I/F 81.

The CPU (an acronym of central processing unit) 4 carries out sequential control of the information processing device 2 on the basis of the operating system (hereafter called the OS), which provides basic software.

The ROM (an acronym of read only memory) 5 records a program, such as that which is executed in start-up of the information processing device 2.

The RAM (an acronym of random access memory) 6 is used as an buffer area for the work area which is required for execution of a program.

The HD (an acronym of hard disk) 7 stores an OS, an application program (hereafter called an application), a printer driver, and various types of data.

The I/F (an acronym of interface) 81 carries out transmission and reception of various types of data between it and the printer 3.

The information processing device 2 comprises components, such as a monitor display which is capable of visually displaying an application screen and other various types of information, a CD-ROM drive, a floppy (which is a registered trademark) display drive, and an input device, such as a keyboard or a mouse, which are, however, not shown.

Next, the scheme where a printer driver A according to the present invention acquires a driver file from the printer 3 when the information processing device 2 is connected to the printer 3 will be described in detail.

Figure 2:
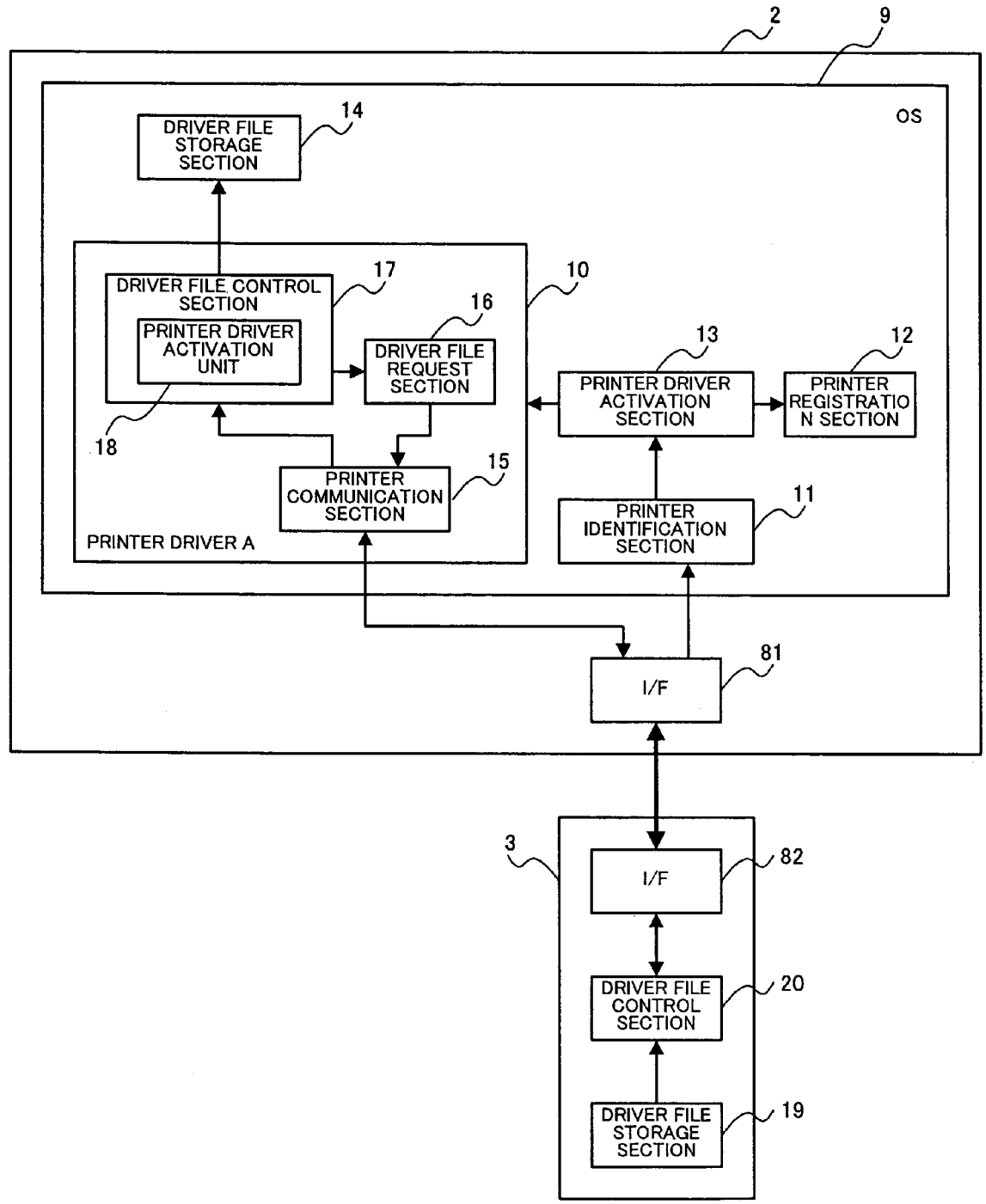
FIG. 2 is a block diagram illustrating a functional configuration of the information processing device 2 and the printer 3 that is provided when the information processing device 2 and the printer 3 are connected to each other.

FIG. 2 is a block diagram illustrating a functional configuration of the information processing device 2 and the printer 3 that is provided when the information processing device 2 and the printer 3 are connected to each other.

Here, the functional configuration of the information processing device 2 will be described in detail.

As shown in FIG. 2, an OS 9 and a printer driver A, 10, are installed in the information processing device 2.

The OS 9 comprises a printer identification section 11 which identifies the connection to the printer 3; a printer registration section 12 which registers the correspondence of the printer 3 to the driver file; a printer driver activation section 13 which activates the printer driver A, 10, when the printer identification section 11 identifies the connection to the printer 3; and a driver file storage section 14 which stores the driver file for the printer 3 that is acquired by the printer driver A, 10. For the printer identification section 11, the scheme where the connection to the printer 3 is identified by utilizing the plug and play function may be applied, or the scheme where the connection to the printer 3 is identified through the manual operation of the user may be applied.

The printer driver A, 10, comprises a printer communication section 15, a driver file request section 16, and a driver file control section 17.

Here, these components of the printer driver A, 10, will be described in detail.

The printer communication section 15 carries out processing for communicating with the printer 3 connected thereto through the I/F 81 of the information processing device 2.

The driver file request section 17 carries out processing for requesting the driver file held by the printer 3 of the printer 3 through the printer communication section 15 when the printer driver A, 10, is activated by the printer driver activation section 13 of the OS 9.

The driver file request section 17 carries out processing for storing and holding the driver file acquired from the printer 3 in the driver file storage section 14. The driver file control section 17 has printer driver activation unit 18 which provides a function for activating the printer driver corresponding to the driver file stored and held in the driver file storage section 14.

Here the functional configuration of the printer 3 will be described in detail.

As shown in FIG. 2, the printer 3 comprises an I/F 82, a driver file storage section 19, and a driver file control section 20.

The I/F 82 carries out transmission and reception of various types of data between it and the information processing device 2.

The driver file storage section 19 stores and holds the driver file corresponding to the printer 3.

The driver file control section 20 carries out processing for submitting the driver file stored and held in the driver file storage section 19 to the information processing device 2 in accordance with a request for the printer driver from the information processing device 2.

When the printer 3 is to be printer object registered to the OS 9, only the printer driver A, 10, can be used for registration to the OS 9.

Next, the functional operation which is carried out by the OS 9 and the printer driver A, 10, of the information processing device 2, and the printer 3 when the information processing device 2 is connected with the printer 3 will be described in detail with reference to FIG. 2.

When the information processing device 2 is connected with the printer 3 through the I/F (81, 82), the printer identification section 11 of the information processing device 2 identifies the connection with the printer 3, and notifies the printer driver activation section 13 of the printer 3 having been connected, then, when the printer driver activation section 13 receives a notification of the printer 3 having been connected, the printer driver activation section 13 verifies the driver file corresponding to the printer 3 that has been identified by the printer identification section 11, on the basis of the correspondence of the printer 3 to the driver file that is previously registered to the printer registration section 12.

Here, the printer driver activation section 13 activates the printer driver A, 10, which requests the verified driver file of the printer 3, for example.

When the printer driver A, 10, is activated by the printer driver activation section 13, the driver file control section 17 checks whether or not the driver file corresponding to the printer 3 that has been identified by the printer identification section 11 is stored and held in the driver file storage section 14.

Here, where the pertinent driver file is stored and held in the driver file storage section 14, the printer driver activation unit 18 activates the printer driver corresponding to the pertinent driver file.

Where the pertinent driver file is not stored and held in the driver file storage section 14, the driver file control section 17 notifies the driver file request section 16 of the pertinent driver file being not stored and held, and when the driver file request section 16 receives a notification of the pertinent driver file being not stored and held, the driver file request section 16 passes the request for the driver file of the printer 3 to the printer communication section 15, which, with the reception of the request for the driver file, transmits the received request for the driver file to the printer 3 through the I/F 81.

When the driver file control section 20 of the printer 3 receives the request for the driver file from the information processing device 2 through the I/F 81, the driver file control section 20 reads out the driver file from the driver file storage section 19, and transmits the read out driver file to the information processing device 2 through the I/F 81.

When the printer communication section 15 receives the driver file from the printer 3 through the I/F 81, the printer communication section 15 passes the received driver file to the driver file control section 17, which, with the reception of the driver file, stores and holds the received driver file in the driver file storage section 14, and the printer driver activation unit 18 activates the printer driver corresponding to the driver filer stored and held in the driver file storage section 14.

Next, the scheme where the printer driver A, 10, according to the present invention, and the printer driver corresponding to the printer 3 that has been activated by the printer driver A, 10, (hereafter called a printer driver B) carry out printing processing when the information processing device 2 requests the printer 3 of printing will be described in detail.

Figure 3:
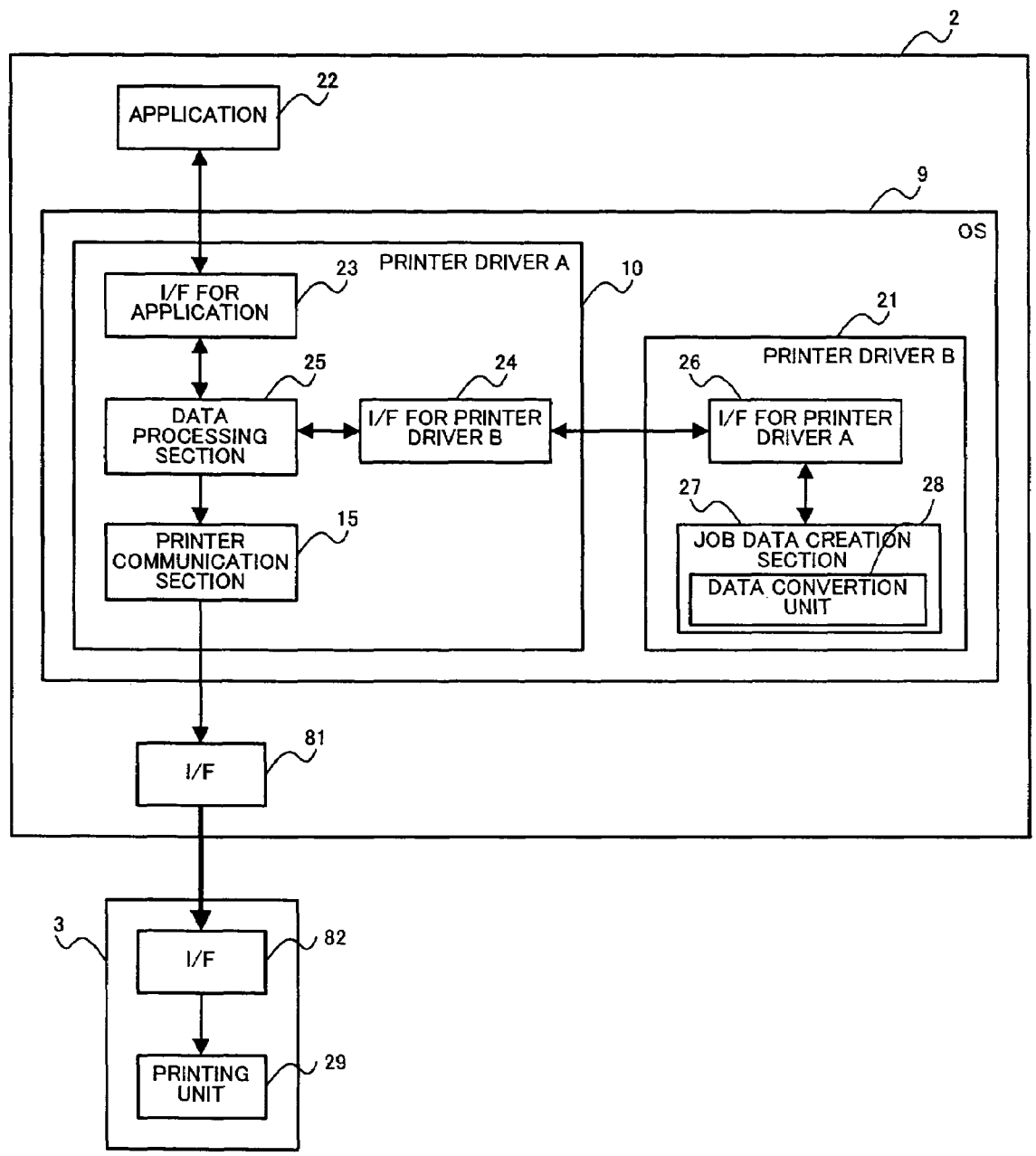
FIG. 3 is a block diagram illustrating the functional configuration of the information processing device 2 and the printer 3 that is provided when the printer driver A, 10, and the printer driver B, 21, are activated.

FIG. 3 is a block diagram illustrating the functional configuration of the information processing device 2 and the printer 3 that is provided when the printer driver A, 10, and the printer driver B, 21, are activated.

Here, the functional configuration of the information processing device 2 will be described in detail.

As shown in FIG. 3, the OS 9, an application 22 for carrying out of data processing, the printer driver A, 10, and the printer driver B, 21, are installed in the information processing device 2.

The printer driver A, 10, comprises an I/F for application, 23, an I/F for printer driver B, 24, a data processing section 25, and a printer communication section.

Here, the components of the printer driver A, 10, will be described in detail.

The I/F for application, 23, carries out transmission and reception of various types of data between it and the application 22.

The I/F for printer driver B, 24, carries out transmission and reception of various types of data between it and the printer driver B, 21.

The data processing section 25 carries out processing of the printing instruction received from the application 22, and the job data received from the printer driver B 21.

The printer communication section 15 carries out processing for communicating with the printer 3 connected through the I/F 81 of the information processing device 2.

The printer driver B, 21, comprises an I/F for printer driver A, 26, and a job data creation section 27.

Here, the components of the printer driver B, 21, will be described in detail.

The I/F for printer driver A, 26, carries out transmission and reception of various types of data between it and the printer driver A, 10.

The job data creation section 27 carries out processing for creating job data on the basis of the printing instruction received from the printer driver A, 10. The job data creation section 27 has data conversion unit 28 which provides a function of generating printing data by converting the printing contents into the printer control code which can be interpreted by the printer 3.

Here, the functional configuration of the printer 3 will be described in detail.

As shown in FIG. 3, the printer 3 comprises the I/F 82 and a printing unit 29.

The I/F 82 carries out transmission and reception of various types of data between it and the information processing device 2.

The printing unit 29 carries out printing processing for forming the printing data received from the information processing device 2 on a paper.

Next, the functional operation which is carried out by the printer driver A, 10, and the printer driver B, 21, of the information processing device 2, and the printer 3 when the information processing device 2 requests printing of the printer 3 will be described in detail with reference to FIG. 3.

When the data processing section 25 of the printer driver A, 10, receives a printing instruction from the application 22 through the I/F for application, 23, the data processing section 25 outputs the received printing instruction to the printer driver B, 21, through the I/F for printer driver B, 24.

When the job data creation section 27 of the printer driver B, 21, receives the printing instruction from the printer driver A, 10, the job data creation section 27 creates job data on the basis of the received printing instruction, and the data conversion unit 28 generates printing data by converting the printing contents into the printer control code. And, the job data creation section 27 outputs the job data to the printer driver A, 10, through the I/F for printer driver A, 26.

When the data processing section 25 receives the job data from the printer driver B, 21, through the I/F for printer driver B, 24, the data processing section 25 outputs the processing result contained in the received job data to the application 22 through the I/F for application, 23, and passes the printing data contained in the job data to the printer communication section 15, and when the printer communication section 15 receives the printing data, it transmits the received printing data to the printer 3 through the I/F 81.

When the printing unit 29 of the printer 3 receives the printing data from the information processing device 2 through the I/F 82, the printing unit 29 carries out printing processing for forming the received printing data on a paper.

Figure 4:
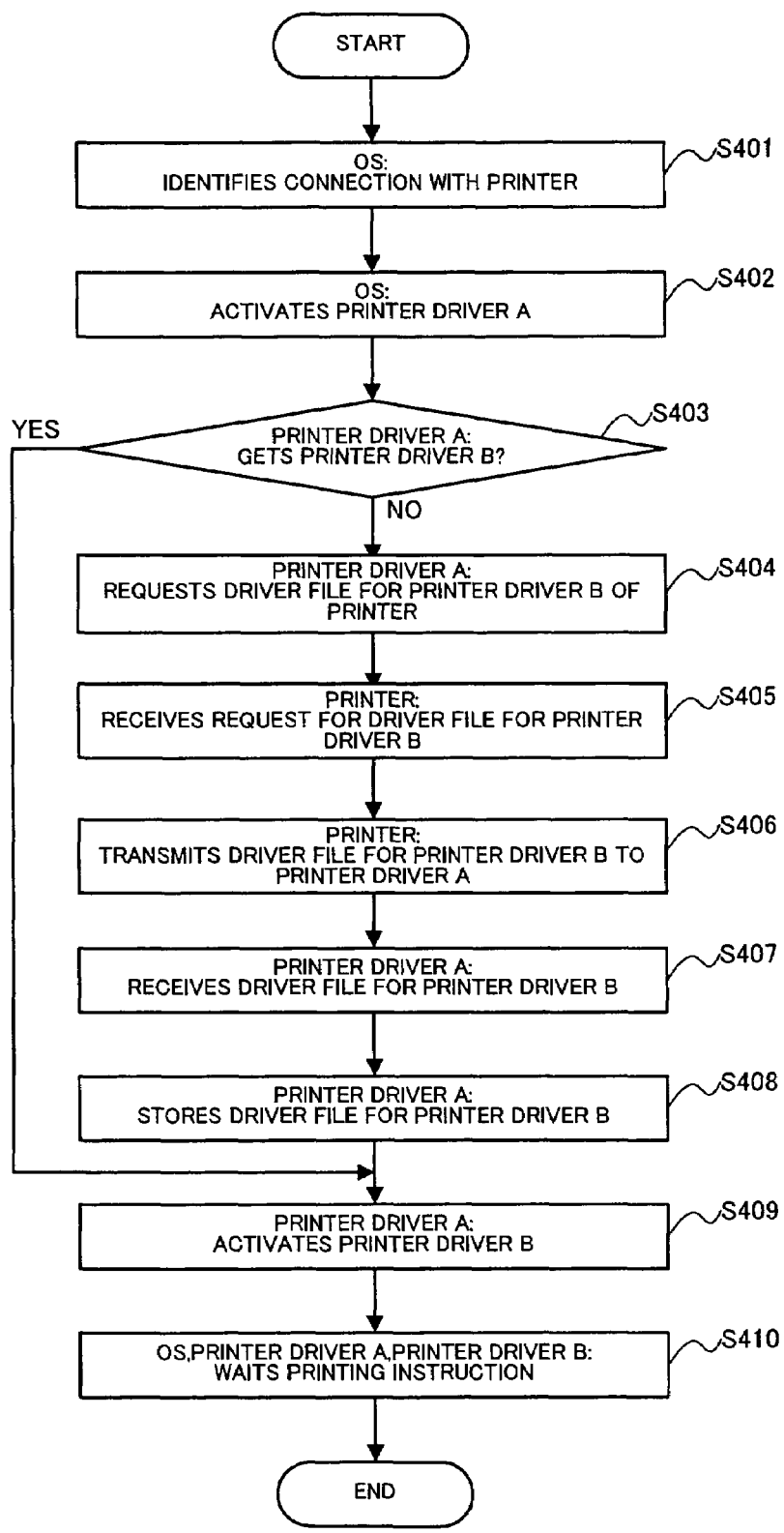
FIG. 4 is a flow chart illustrating the procedure for driver file acquisition processing which is carried out by the OS 9 and the printer driver A, 10, of the information processing device 2, and the printer 3 when the information processing device 2 is connected with the printer 3.

Next, the procedure for driver file acquisition processing which is carried out by the OS 9 and the printer driver A, 10, of the information processing device 2, and the printer 3 when the information processing device 2 is connected with the printer 3 will be described with reference to the flow chart as shown in FIG. 4. It is assumed that the printer driver corresponding to the printer 3 connected to the information processing device 2 is the printer driver B, 21.

The OS identifies the connection to the printer (at step S401), and the OS activates the printer driver A (at step S402).

The program checks whether or not the printer driver A has already acquired the printer driver B (at step S403).

When it is verified that the printer driver A has not acquired the printer driver B (NO at step S403), the printer driver A requests the driver file for the printer driver B of the printer (at step S404).

The printer receives the request for the driver file for the printer driver B (at step S405), and the printer transmits the driver file for the printer driver B to the printer driver A (at step S406).

The printer driver A receives the driver file for the printer driver B (at step S407), and the printer driver A stores the driver file for the printer driver B (at step S408).

At step S403, when it is verified that the printer driver A has already acquired the printer driver B (YES at step S403), the program proceeds to the step S409.

The printer driver A activates the printer driver B (at step S409).

The OS, the printer driver A, and the printer driver B enter the printing instruction wait state (at step S410), the procedure for driver file acquisition processing being ended.

Figure 5:
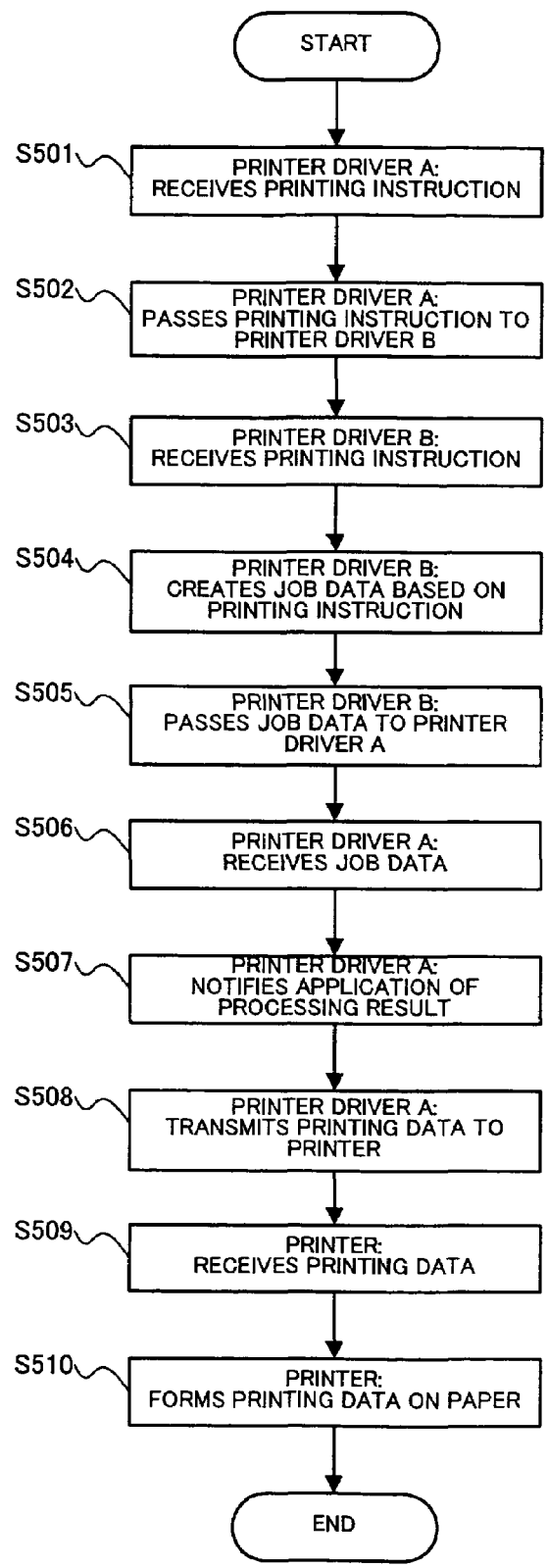
FIG. 5 is a flow chart illustrating the procedure for printing processing which is carried out by the printer driver A, 10, and the printer driver B, 21, of the information processing device 2, and the printer 3 when the information processing device 2 which has ended the procedure for driver file acquisition processing in the flowchart.

Next, the procedure for printing processing which is carried out by the printer driver A, 10, and the printer driver B, 21, of the information processing device 2, and the printer 3 when the information processing device 2 which has ended the procedure for driver file acquisition processing in the flowchart as shown in FIG. 4 requests printing of the printer 3 will be described with reference to the flow chart as shown in FIG. 5.

The printer driver A receives the printing instruction (at step S501), and the printer driver A passes the printing instruction to the printer driver B (at step S502).

The printer driver B receives the printing instruction (at step S503), the printer driver B creates job data on the basis of the printing instruction (at step S504), and the printer driver B passes the job data to the printer driver A (at step S505).

The printer driver A receives the job data (at step S506), the printer driver A notifies the application of the processing result (at step S507), and the printer driver A transmits the printing data to the printer (at step S508).

The printer receives the printing data (at step S509), and the printer forms the printing data on a paper (at step S510), ending the procedure for printing processing.

Next, the scheme where the printer driver A, 10, according to the present invention acquires the driver file from the pertinent printer 3 when the information processing device 2 requests printing of the printer 3 will be described in detail.

Figure 6:
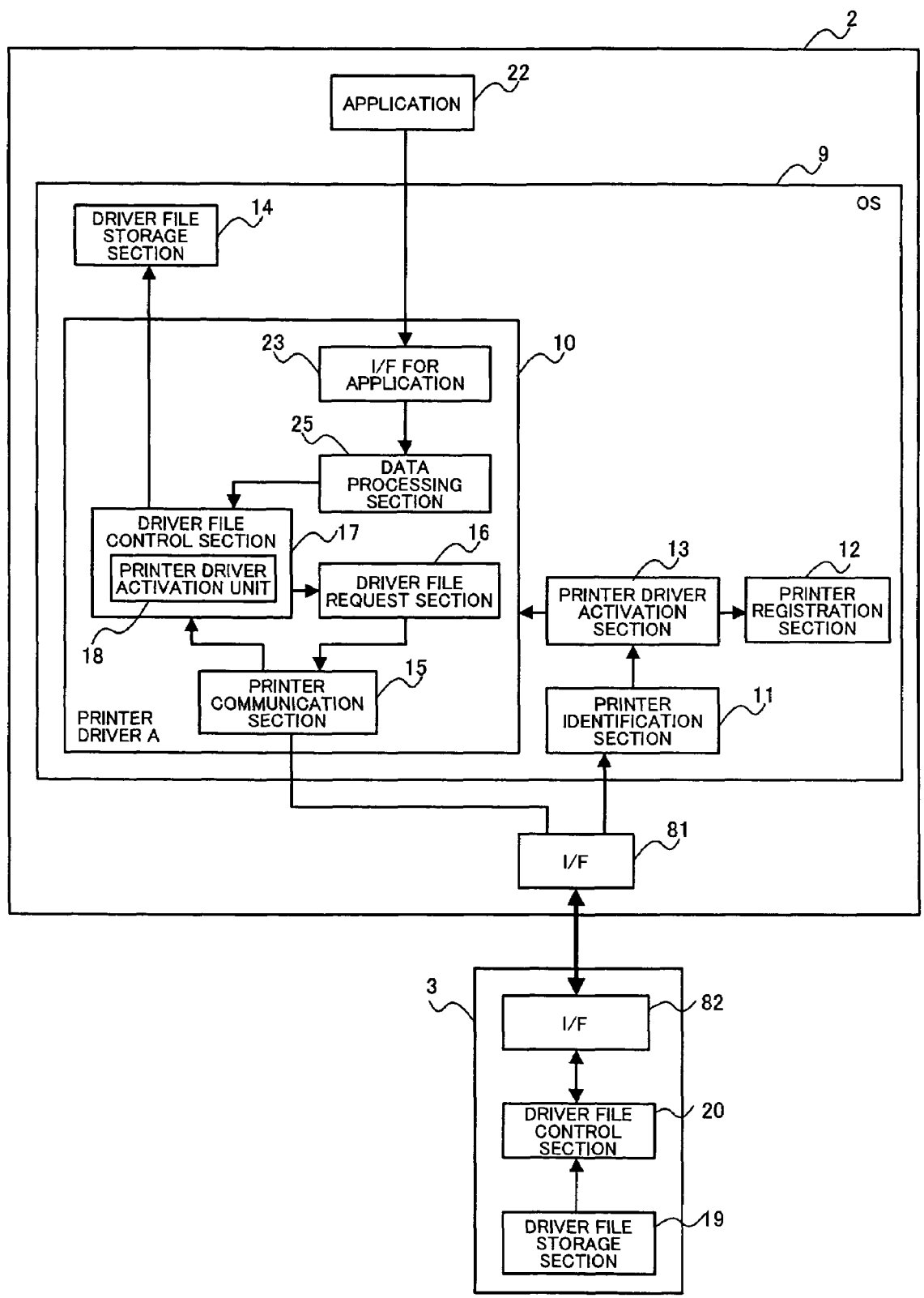
FIG. 6 is a block diagram illustrating the functional configuration of the information processing device 2 and the printer 3 that is provided when the information processing device 2 requests printing of the printer 3.

FIG. 6 is a block diagram illustrating the functional configuration of the information processing device 2 and the printer 3 that is provided when the information processing device 2 requests printing of the printer 3.

Here, the functional configuration of the information processing device 2 will be described in detail.

As shown in FIG. 6, the OS 9, the application 22 for carrying out of data processing, and the printer driver A, 10, are installed in the information processing device 2.

The OS 9 comprises the printer identification section 11 which identifies the connection to the printer 3; the printer registration section 12 which registers the correspondence of the printer 3 to the driver file; the printer driver activation section 13 which activates the printer driver A, 10, when the printer identification section 11 identifies the connection to the printer 3; and the driver file storage section 14 which stores the driver file for the printer 3 that is acquired by the printer driver A, 10. For the printer identification section 11, the scheme where the connection to the printer is identified by utilizing the plug and play function may be applied, or the scheme where the connection to the printer 3 is identified through the manual operation of the user may be applied.

The printer driver A, 10, comprises the I/F for application, 23, for carrying out transmission and reception of various types of data between it and the application 22; the data processing section 25 for carrying out processing the printing instruction received from the application 22; the printer communication section 15 for communicating with the printer 3 connected through the I/F 81 of the information processing device 2; the driver file request section 16 which requests the driver file held by the printer 3 of the printer 3 through the printer communication section 15; and the driver file control section 17 which stores and holds the driver file acquired from the printer 3 in the driver file storage section 14. The driver file control section 17 has the printer driver activation unit 18 which provides a function for activating the printer driver corresponding to the driver file stored and held in the driver file storage section 14.

Here the functional configuration of the printer 3 will be described in detail.

As shown in FIG. 6, the printer 3 comprises the I/F 82 for carrying out transmission and reception of various types of data between it and the application 22; the driver file storage section 19 which stores and holds the driver file corresponding to the printer 3; and the driver file control section 20 which submits the driver file stored and held in the driver file storage section 19 to the information processing device 2 in accordance with a request for the printer driver from the information processing device 2.

Next, the functional operation which is carried out by the OS 9 and the printer driver A, 10, of the information processing device 2, and the printer 3 when the information processing device 2 requests printing of the printer 3 will be described in detail with reference to FIG. 6.

When the information processing device 2 is connected with the printer 3 through the I/F (81, 82), the printer identification section 11 of the information processing device 2 identifies the connection with the printer 3, and notifies the printer driver activation section 13 of the printer 3 having been connected, then, when the printer driver activation section 13 receives a notification of the printer 3 having been connected, the printer driver activation section 13 verifies the driver file corresponding to the printer 3 that has been identified by the printer identification section 11, on the basis of the correspondence of the printer 3 to the driver file that is previously registered to the printer registration section 12. Here, the printer driver activation section 13 activates the printer driver A, 10, which requests the verified driver file of the printer 3, for example.

When the data processing section 25 of the printer driver A, 10, receives the printing instruction through the I/F for application, 23, the data processing section 25 passes the received printing instruction to the driver file control section 17, which, with the reception of the printing instruction, checks whether or not the driver file corresponding to the printing assigned printer designation contained in the received printing instruction is stored and held in the driver file storage section 14.

Here, where the pertinent driver file is stored and held in the driver file storage section 14, the printer driver activation unit 18 activates the printer driver corresponding to the pertinent driver file.

Where the pertinent driver file is not stored and held in the driver file storage section 14, the driver file control section 17 notifies the driver file request section 16 of the pertinent driver file being not stored and held, and when the driver file request section 16 receives a notification of the pertinent driver file being not stored and held, the driver file request section 16 passes the request for the driver file of the printer 3 to the printer communication section 15, which, with the reception of the request for the driver file, transmits the received request for the driver file to the printer 3 through the I/F 81.

When the driver file control section 20 of the printer 3 receives the request for the driver file from the information processing device 2 through the VF 81, the driver file control section 20 reads out the driver file from the driver file storage section 19, and transmits the read out driver file to the information processing device 2 through the I/F 81.

When the printer communication section 15 of the printer driver A, 10, receives the driver file from the printer 3 through the I/F 81, the printer communication section 15 passes the received driver file to the driver file control section 17, which, with the reception of the driver file, stores and holds the received driver file in the driver file storage section 14, and the printer driver activation unit 18 activates the printer driver corresponding to the driver filer stored and held in the driver file storage section 14.

For the functional operation following the activation of the printer driver, detailed description will be omitted, because of the similarity to the functional operation which is carried out by the printer driver A, 10, and the printer driver B, 21, of the information processing device 2, and the printer 3, which is above described with reference to FIG. 3.

Figure 7:
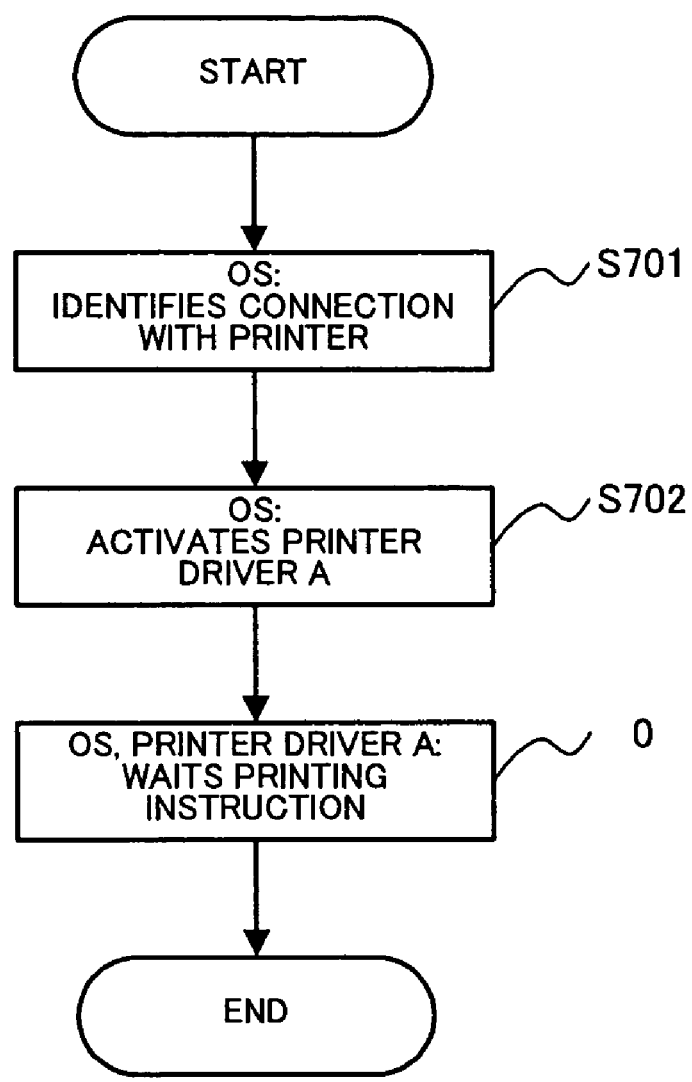
FIG. 7 is a flow chart illustrating the procedure for printer driver activation processing which is carried out by the OS 9 of the information processing device 2 when the information processing device 2 is connected with the printer 3.

Next, the procedure for printer driver activation processing which is carried out by the OS 9 of the information processing device 2 when the information processing device 2 is connected with the printer 3 will be described with reference to the flow chart as shown in FIG. 7.

The OS identifies the connection to the printer (at step S701), and the OS activates the printer driver A (at step S702).

The OS and the printer driver A enter the printing instruction wait state (at step S703), the procedure for printer driver activation processing being ended.

Figure 8:
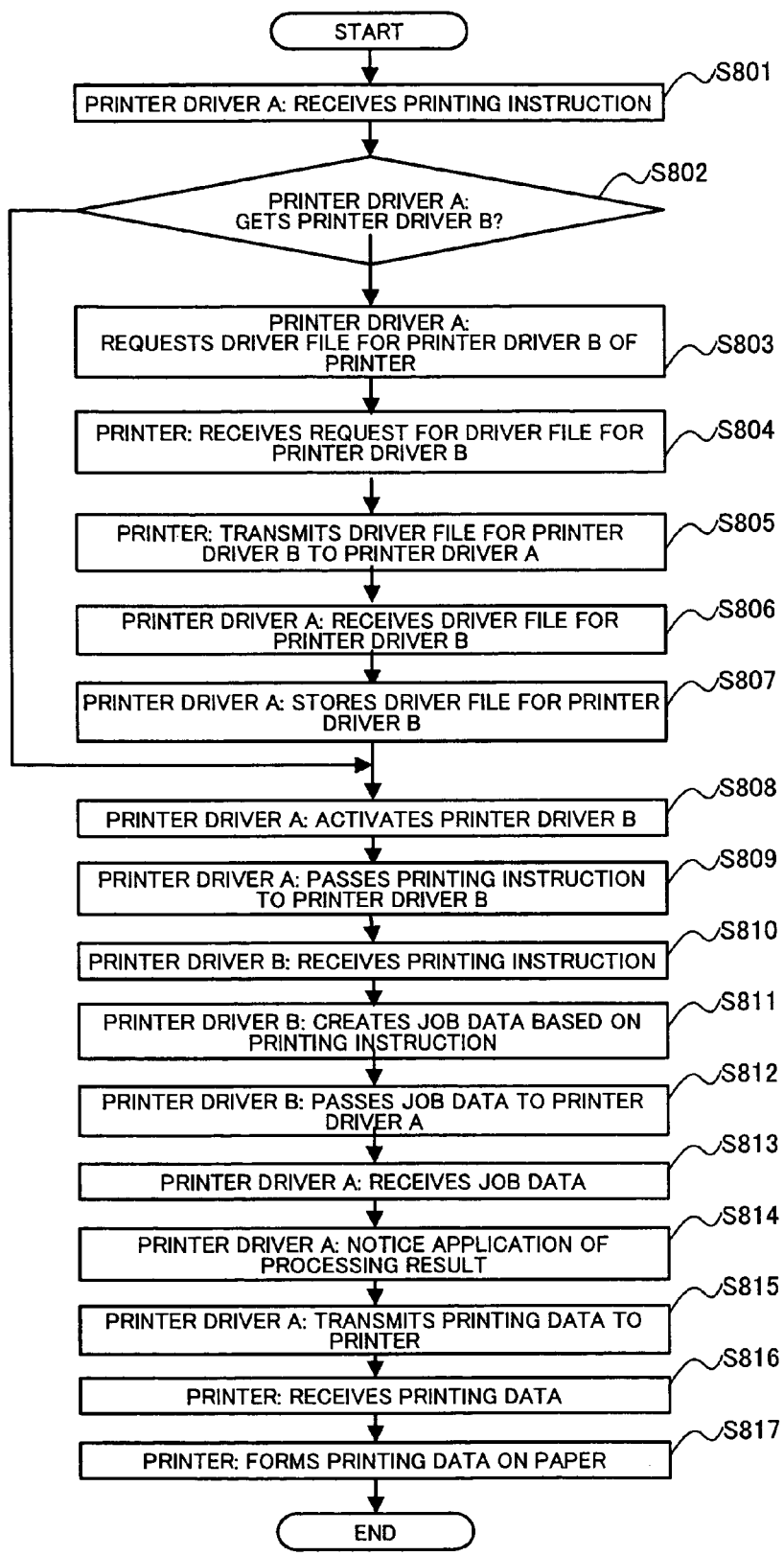
FIG. 8 is a flow chart illustrating the procedure for printing processing which is carried out by the printer driver A, 10, the printer driver B, 21, and the printer 3 when the information processing device 2 which has ended the procedure for printer driver activation.

Next, the procedure for printing processing which is carried out by the printer driver A, 10, the printer driver B, 21, and the printer 3 when the information processing device 2 which has ended the procedure for printer driver activation processing in the flowchart as shown in FIG. 7 requests printing of the printer 3 will be described with reference to the flow chart as shown in FIG. 8. It is assumed that the printer driver corresponding to the printer 3 connected to the information processing device 2 is the printer driver B, 21.

The printer driver A receives the printing instruction (at step S801), and the program checks whether or not the printer driver A has already acquired the printer driver B (at step S802).

When it is verified that the printer driver A has not acquired the printer driver B (NO at step S802), the printer driver A requests the driver file for the printer driver B of the printer (at step S803).

The printer receives the request for the driver file for the printer driver B (at step S804), and the printer transmits the driver file for the printer driver B to the printer driver A (at step S805).

The printer driver A receives the driver file for the printer driver B (at step S806), and the printer driver A stores the driver file for the printer driver B (at step S807).

At step S802, when it is verified that the printer driver A has already acquired the printer driver B (YES at step S802), the program proceeds to the step S808.

The printer driver A activates the printer driver B (at step S808), and the printer driver A passes the printing instruction to the printer driver B (at step S809).

The printer driver B receives the printing instruction (at step S503), the printer driver B creates job data on the basis of the printing instruction (at step S504), and the printer driver B passes the job data to the printer driver A (at step S505).

The printer driver B receives the printing instruction (at step S810), the printer driver B creates job data on the basis of the printing instruction (at step S811), and the printer driver B passes the job data to the printer driver A (at step S812).

The printer driver A receives the job data (at step S813), the printer driver A notifies the application of the processing result (at step S814), and the printer driver A transmits the printing data to the printer (at step S815).

The printer receives the printing data (at step S816), and the printer forms the printing data on a paper (at step S817), ending the procedure for printing processing.

For the way of handling the printer driver B, 21, after the printing processing, the scheme where the driver file for the printer driver B, 21, is stored and held after the printing processing, and the driver file for the printer driver B, 21, is not requested of the printer 3 may be applied; the scheme where the driver file for the printer driver B, 21, is deleted after the printing processing, and every time the printer 3 is requested to carry out printing, the driver file for the printer driver B, 21, is requested thereof may be applied; and the scheme where, after the driver file for the printer driver B, 21, having been acquired, the printer driver A, 10, and the printer driver B, 21, are synthesized into a single printer driver may be applied.

In addition, the present invention is not limited to the configuration where the printer driver A, 10, is installed in the information processing device 2 as with the above described embodiment, but may be embodied in the configuration where the information processing device 2 incorporates or connects to a peripheral equipment control device having the same capability as that of the printer driver A, 10, as described above.

The configuration where an information processing device in which the peripheral equipment control program (hereafter called the printer driver) corresponding to the printer according to the present invention is installed is connected to the printer according to the present invention through the network will be described in detail as a second embodiment of the present invention.

Figure 9:
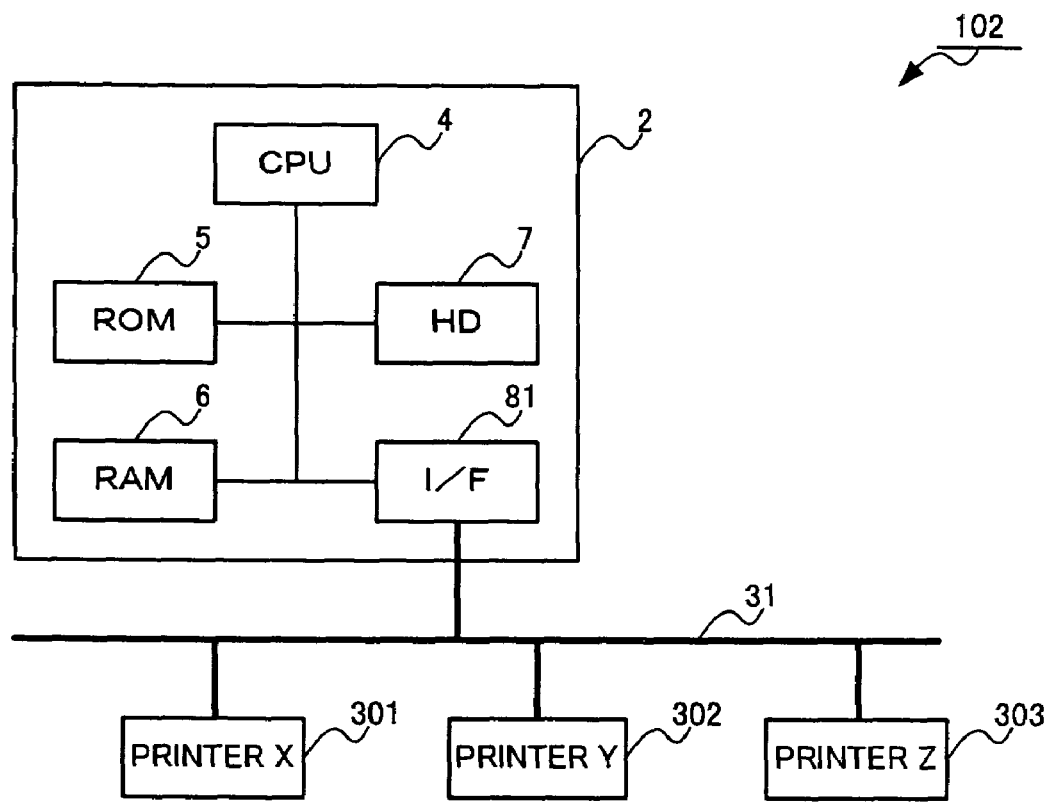
FIG. 9 is a block diagram illustrating an example of the entire configuration of a printing system 102 to be used in the second embodiment of the present invention.

FIG. 9 is a block diagram illustrating an example of the entire configuration of a printing system 102 to be used in the second embodiment of the present invention.

As shown in FIG. 9, the information processing device 2 is connected to a plurality of printers (printer X301, printer Y302, printer Z303) through a network 31.

For the components of the printing system 102 as shown in FIG. 9 that is to be used in the second embodiment of the present invention, detailed description will be omitted, because of the similarity to the components of the printing system 101 which is used in the first embodiment of the present invention that is above described with reference to FIG. 1.

As shown in FIG. 9, the information processing device 2 comprises a CPU 4, an ROM 5, an RAM 6, an HD 7, and an I/F 81 which carries out transmission and reception of various types of data between it and a plurality of printers (301, 302, 303) through the network 31.

For the CPU 4, the ROM 5, the RAM 6, and the HD 7 which are comprised in the information processing device 2 as shown in FIG. 9, detailed description will be omitted, because of the similarity to the CPU 4, the ROM 5, the RAM 6, and the HD 7 which are comprised in the information processing device 2 in the printing system 101 which is used in the first embodiment of the present invention that is above described with reference to FIG. 1.

Next, the scheme where the printer driver A, 10, according to the present invention acquires the driver file from the printer (301, 302, 303) on the network 31, when the information processing device 2 is connected to the network 31 will be described in detail.

Figure 10:
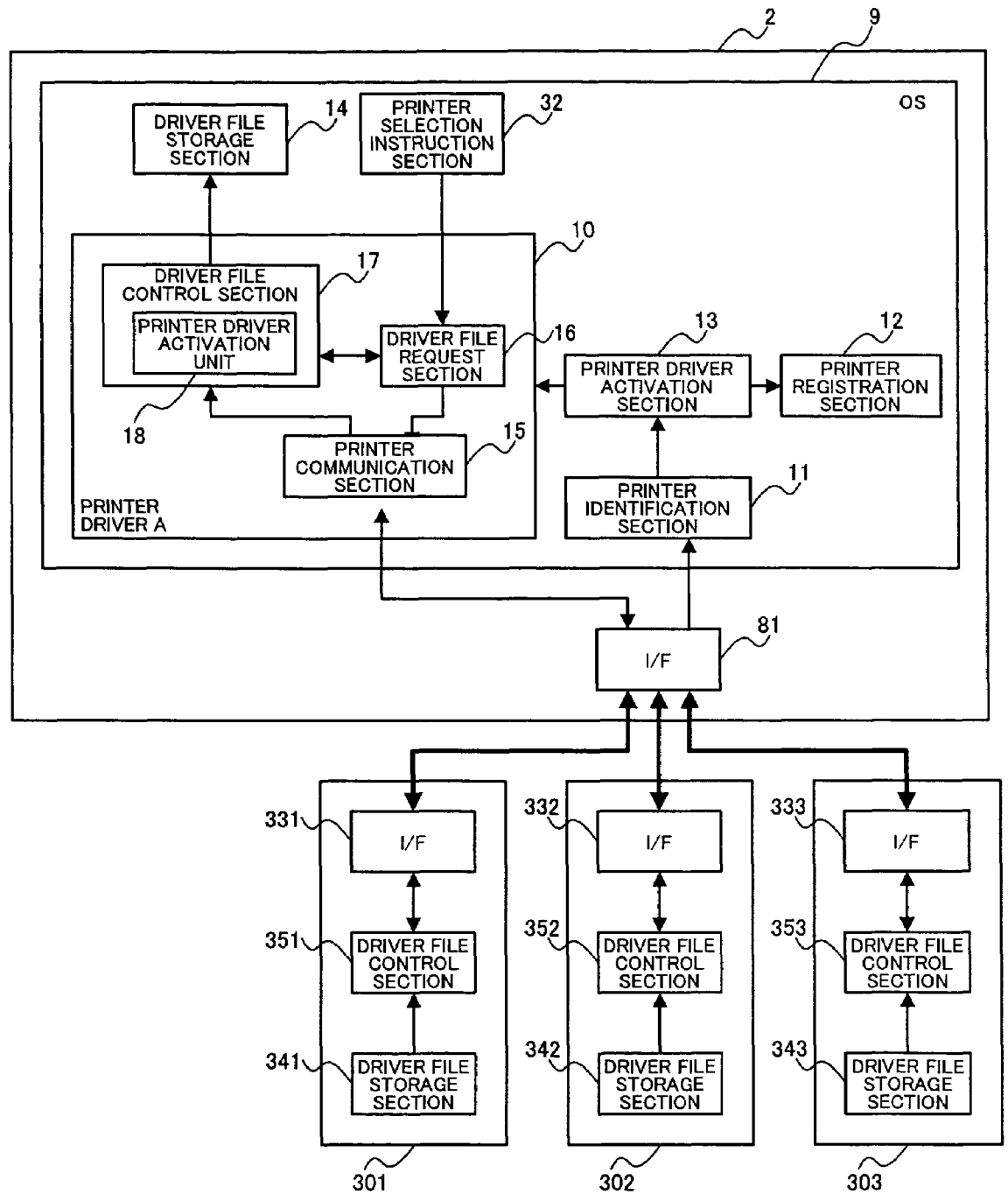
FIG. 10 is a block diagram illustrating the functional configuration of the information processing device 2 and the printer (301, 302, 303) on the network 31 when the information processing device 2 is connected to the network 31.

FIG. 10 is a block diagram illustrating the functional configuration of the information processing device 2 and the printer (301, 302, 303) on the network 31 when the information processing device 2 is connected to the network 31.

Here, the functional configuration of the information processing device 2 will be described in detail.

As shown in FIG. 10, the OS 9 and the printer driver A, 10, are installed in the information processing device 2.

The OS 9 comprises a printer registration section 12; a printer driver activation section 13; a driver file storage section 14; a printer identification section 11 which identifies the printer (301, 302, 303) on the network 31; and a printer selection instruction section 32 which selects the printer 3 corresponding to the requested printer driver for giving an instruction. For the printer identification section 11, the scheme where the connection to the printer 3 is identified by utilizing the plug and play function may be applied, or the scheme where the connection to the printer 3 is identified through the manual operation of the user may be applied.

For the printer registration section 12, the printer driver activation section 13, and the driver file storage section 14, which provide the functional configuration of the information processing device 2, detailed description will be omitted, because of the similarity to the printer registration section 12, the printer driver activation section 13, and the driver file storage section 14, which provide the functional configuration of the information processing device 2 of the printing system 101 which is used in the first embodiment of the present invention that is above described with reference to FIG. 2.

The printer driver A, 10, comprises a printer communication section 15, a driver file request section 16, and a driver file control section 17.

For the printer communication section 15, the driver file request section 16, and the driver file control section 17, which provide the functional configuration of the printer driver A, 10, as shown in FIG. 10, detailed description will be omitted, because of the similarity to the printer communication section 15, the driver file request section 16, and the driver file control section 17, which provide the functional configuration of the printer driver A, 10, of the printing system 101 which is used in the first embodiment of the present invention that is above described with reference to FIG. 2.

Here, the functional configuration of the printer 3 will be described in detail.

As shown in FIG. 10, the printer (printer X printer Y, printer Z) comprises a driver file storage section (341, 342, 343) and a driver file control section (351, 352, 353).

For the I/F (331, 332, 333), the driver file storage section (341, 342, 343), and the driver file control section (351, 352, 353), which provide the functional configuration of the printer 3 as shown in FIG. 10, detailed description will be omitted, because of the similarity to the I/F 82, the driver file storage section 19, and the driver file control section 20, which provide the functional configuration of the printer 3 of the printing system 101 which is used in the first embodiment of the present invention that is above described with reference to FIG. 2.

Next, the functional operation which is carried out by the OS 9 and the printer driver A, 10, of the information processing device 2, and the printer (printer X, 301, printer Y, 302, printer Z, 303) when the information processing device 2 is connected with the printer 3 will be described in detail with reference to FIG. 10.

When the I/F 81 of the information processing device 2 is connected with the network 31, the printer identification section 11 of the information processing device 2 identifies the printer (printer X, 301, printer Y, 302, printer Z, 303 in FIG. 10), and notifies the printer driver activation section 13 of the information processing device 2 having been connected to the network 31, then, when the printer driver activation section 13 receives a notification of the printer (printer X, 301, printer Y, 302, printer Z, 303 in FIG. 10) having been connected, the printer driver activation section 13 verifies the driver file corresponding to the printer that has been identified by the printer identification section 11, on the basis of the correspondence of the printer to the driver file that is previously registered to the printer registration section 12.

Here, the printer driver activation section 13 activates the printer driver A, 10, which requests the verified driver file of the printer, for example.

When the printer driver A, 10, is activated by the printer driver activation section 13, the driver file request section 16 of the printer driver A, 10, receives the instruction for the printer that has been selected by the printer selection instruction section 32 of the OS 9, and notifies the driver file control section 17 of the received instruction, then when the driver file control section 17 receives a notification of the instruction, the driver file control section 17 checks whether or not the driver file corresponding to the printer that has been selected by the printer selection instruction section 32 is stored and held in the driver file storage section 14.

Here, where the pertinent driver file is stored and held in the driver file storage section 14, the printer driver activation unit 18 activates the printer driver corresponding to the pertinent driver file.

Where the pertinent driver file is not stored and held in the driver file storage section 14, the driver file control section 17 notifies the driver file request section 16 of the pertinent driver file being not stored and held, and when the driver file request section 16 receives a notification of the pertinent driver file being not stored and held, the driver file request section 16 passes the request for the driver file of the printer to the printer communication section 15, which, with the reception of the request for the driver file, transmits the received request for the driver file to the printer through the I/F 81. Hereafter, the case where the request for the driver file X is transmitted to the printer X, 301, will be described as an embodiment.

When the driver file control section 351 of the printer X, 301, receives the request for the driver file X from the information processing device 2 through the I/F 331, the driver file control section 351 reads out the driver file X from the driver file storage section 341, and transmits the read out driver file X to the information processing device 2 through the I/F 331.

When the printer communication section 15 receives the driver file X from the printer X, 301, through the I/F 81, the printer communication section 15 passes the received driver file X to the driver file control section 17, which, with the reception of the driver file X, stores and holds the received driver file X in the driver file storage section 14, and the printer driver activation unit 18 activates the printer driver X corresponding to the driver filer X stored and held in the driver file storage section 14.

Next, the scheme where the printer driver A, 10, according to the present invention, and the printer driver (printer driver X, 371, printer driver Y, 372, printer driver Z, 373) corresponding to the printer that has been activated by the printer driver A, 10, carry out printing processing when the information processing device 2 requests the printer of printing will be described in detail.

Figure 11:
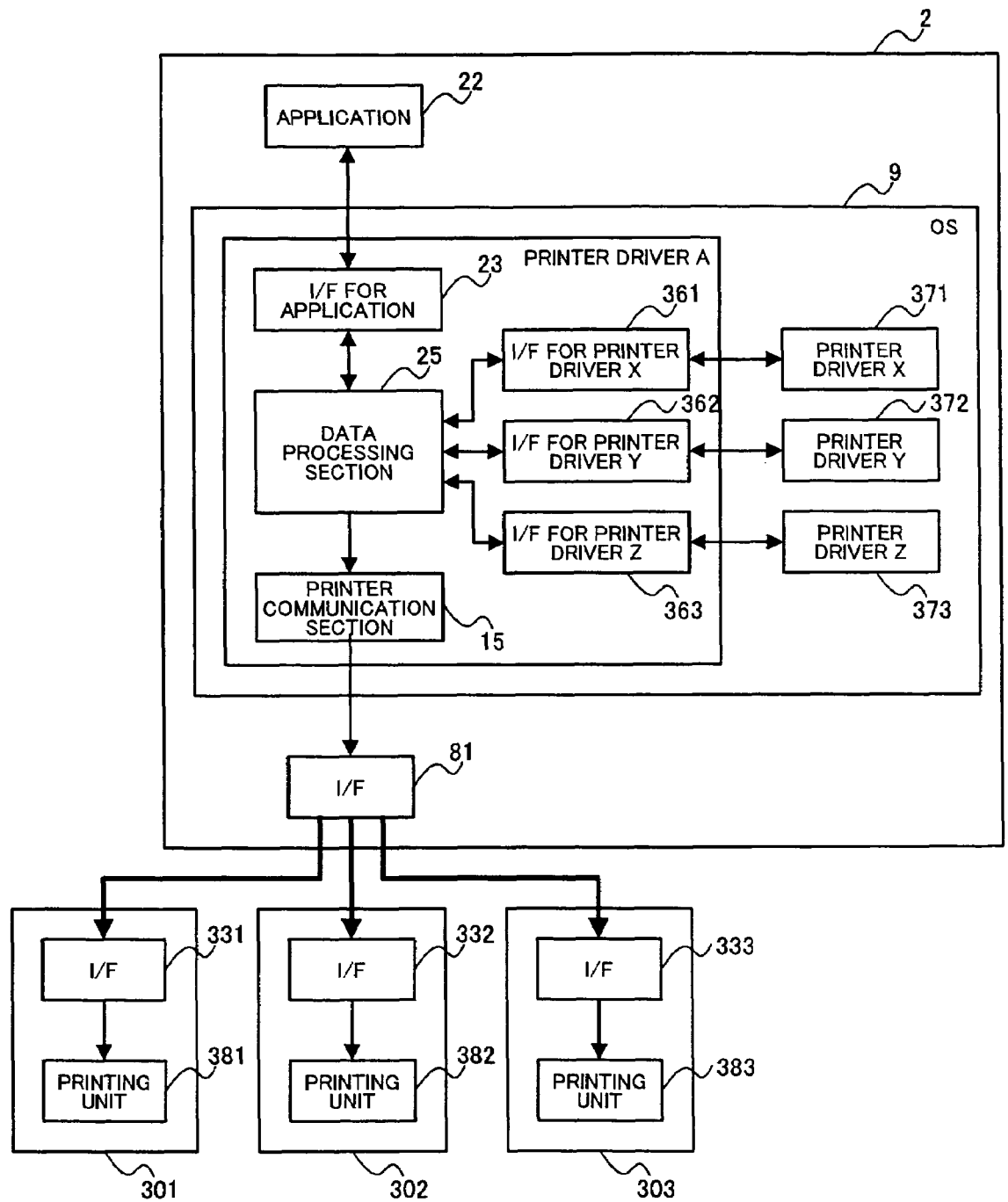
FIG. 11 is a block diagram illustrating the functional configuration of the information processing device 2 and the printer (printer X, 301, printer Y, 302, printer Z, 303) that is provided when the printer driver A, 10, and the printer driver (printer driver X, 371, printer driver Y, 372, printer driver Z, 373) are activated.

FIG. 11 is a block diagram illustrating the functional configuration of the information processing device 2 and the printer (printer X, 301, printer Y, 302, printer Z, 303) that is provided when the printer driver A, 10, and the printer driver (printer driver X 371, printer driver Y, 372, printer driver Z, 373) are activated.

Here, the functional configuration of the information processing device 2 will be described in detail.

As shown in FIG. 11, the OS 9, an application 22, the printer driver A, 10, and the printer driver (printer driver X, 371, printer driver Y, 372, printer driver Z, 373) are installed in the information processing device 2.

The printer driver A, 10, comprises an I/F for application, 23, a data processing section 25, a printer communication section 15, an I/F for printer driver X, 361, which carries out transmission and reception of various types of data between it and the printer driver X, 371, an I/F for printer driver Y, 362, which carries out transmission and reception of various types of data between it and the printer driver Y, 372, and an I/F for printer driver Z, 363, which carries out transmission and reception of various types of data between it and the printer driver Z, 373.

For the I/F for application, 23, the data processing section 25, and the printer communication section 15, which provide the functional configuration of the printer driver A, 10, as shown in FIG. 11, detailed description will be omitted, because of the similarity to the I/F for application, 23, the data processing section 25, and the printer communication section 15, which provide the functional configuration of the printer driver A, 10, of the printing system 101 which is used in the first embodiment of the present invention that is above described with reference to FIG. 3.

The printer driver X, 371, the printer driver Y, 372, and the printer driver Z, 373, as shown in FIG. 11 comprise the same I/F for printer driver A, 26, and job data creation section 27, as those, which provide the functional configuration of the printer driver B, 21, of the printing system 101 which is used in the second embodiment of the present invention that is above described with reference to FIG. 3, and thus the I/F for printer driver A, 26, and the job data creation section 27 will not be shown, and the detailed description will also be omitted.

Here, the functional configuration of the printer (printer X, 301, printer Y, 302, printer Z, 303) will be described in detail.

As shown in FIG. 11, the printer (printer X, 301, printer Y, 302, printer Z, 303) comprises the I/F (331, 332, 333) and the printing unit (381, 382, 383).

For the I/F (331, 332, 333) and the printing unit (381, 382, 383), which provide the functional configuration of the printer X, 301, the printer Y, 302, and the printer Z, 303, detailed description will be omitted, because of the similarity to the I/F 82 and the printing unit 29, which provide the functional configuration of the printer 3 of the printing system 101 which is used in the first embodiment of the present invention that is above described with reference to FIG. 3.

When the printer X, 301, the printer Y, 302, and the printer Z, 303, are to be printer object registered to the OS 9, only the printer driver A, 10, can be used for registration to the OS 9.

Next, the functional operation which is carried out by the printer driver and the printer corresponding to the printer driver A, 10, and the printer of the information processing device 2, and the printer 3 when the information processing device 2 requests printing of the printer will be described in detail with reference to FIG. 11. As an embodiment, the case where the printer driver X, 371, corresponding to the printer X, 301, carries out printing processing in order to requesting printing of the printer X, 301, will be described.

When the data processing section 25 of the printer driver A, 10, receives the printing instruction (containing the instruction for requesting printing of the printer X, 301) from the application 22 through the I/F for application, 23, the data processing section 25 outputs the received printing instruction to the printer driver X, 371, through the I/F for printer driver X, 361.

When the printer driver X, 371, receives the printing instruction from the printer driver A, 10, the printer driver X, 371, creates job data on the basis of the received printing instruction, and generates printing data by converting the printing contents into the printer control code. And, the printer driver X 371, outputs the job data to the printer driver A, 10.

When the data processing section 25 of the printer driver A, 10, receives the job data from the printer driver X, 371, through the I/F for printer driver X, 361, the data processing section 25 outputs the processing result contained in the received job data to the application 22 through the I/F for application, 23, and passes the printing data contained in the job data to the printer communication section 15, and when the printer communication section 15 receives the printing data, it transmits the received printing data to the printer X, 301, through the I/F 81.

When the printing unit 381 of the printer X, 301, receives the printing data from the information processing device 2 through the I/F 331, the printing unit 381 carries out printing processing for forming the received printing data on a paper.

Figure 12:
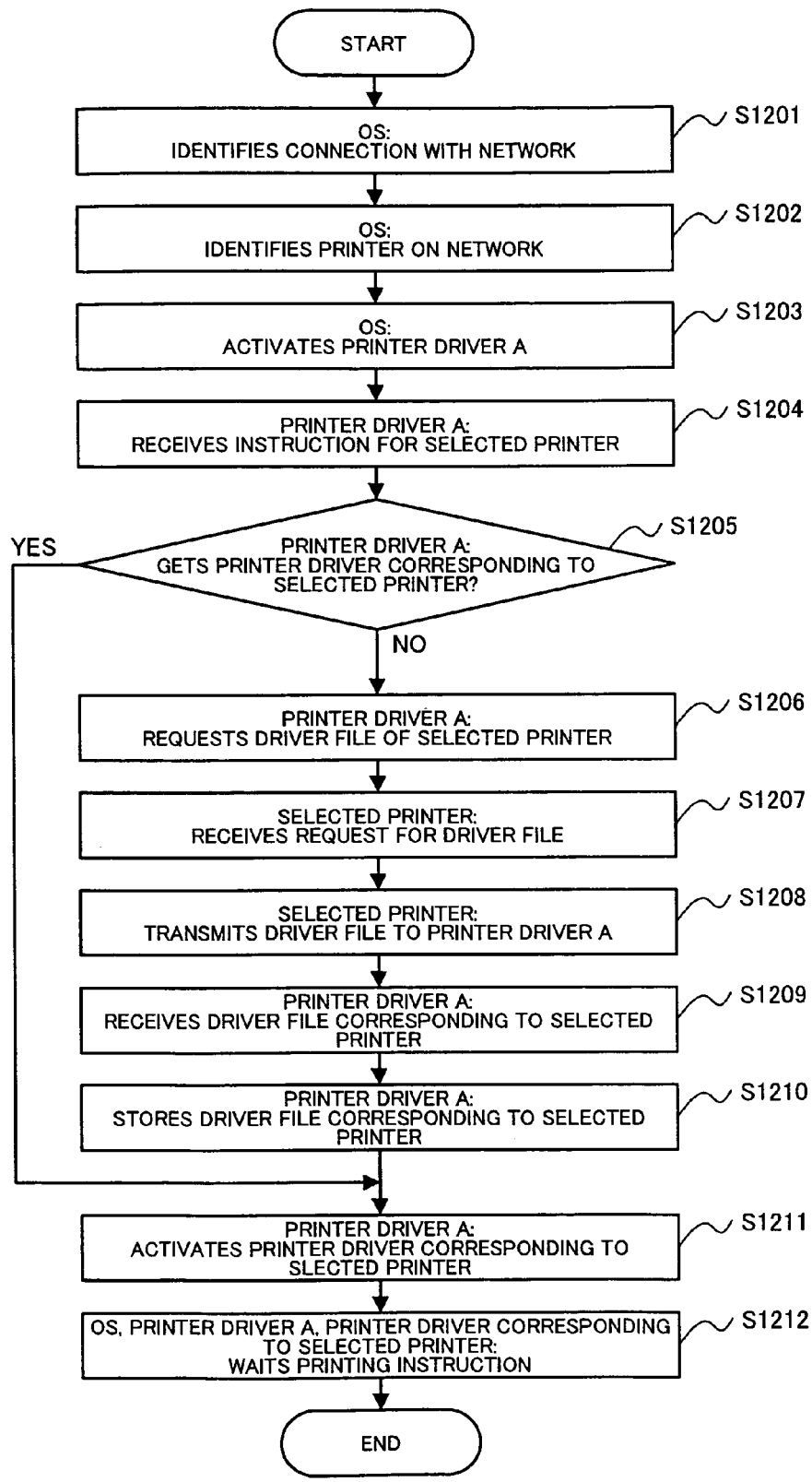
FIG. 12 is a flow chart illustrating the procedure for driver file acquisition processing which is carried out by the OS 9 and the printer driver A, 10, of the information processing device 2, and the printer when the information processing device 2 is connected with the network 31.

Next, the procedure for driver file acquisition processing which is carried out by the OS 9 and the printer driver A, 10, of the information processing device 2, and the printer when the information processing device 2 is connected with the network 31 will be described in detail with reference to the flow chart as shown in FIG. 12.

The OS identifies the connection to the network (at step S1201), the OS identifies the printer on the network (at step S1202), and the OS activates the printer driver A (at step S1203).

The printer driver A receives the instruction for the selected printer (at step S1204).

The program checks whether or not the printer driver A has already acquired the printer driver corresponding to the selected printer (at step S1205).

When it is verified that the printer driver A has not acquired the printer driver corresponding to the selected printer (NO at step S1205), the printer driver A requests the driver file of the selected printer (at step S1206).

The printer receives the request for the driver file (at step S1207), and the selected printer transmits the driver file to the printer driver A (at step S1208).

The printer driver A receives the driver file corresponding to the selected printer (at step S1209), and the printer driver A stores the driver file corresponding to the selected printer (at step S1210).

At step S1205, when it is verified that the printer driver A has already acquired the printer driver corresponding to the selected printer (YES at step S1205), the program proceeds to the step S1211.

The printer driver A activates the printer driver corresponding to the selected printer (at step S1211).

The OS, the printer driver A, and the printer driver corresponding to the selected printer enter the printing instruction wait state (at step S1212), the procedure for driver file acquisition processing being ended.

Figure 13:
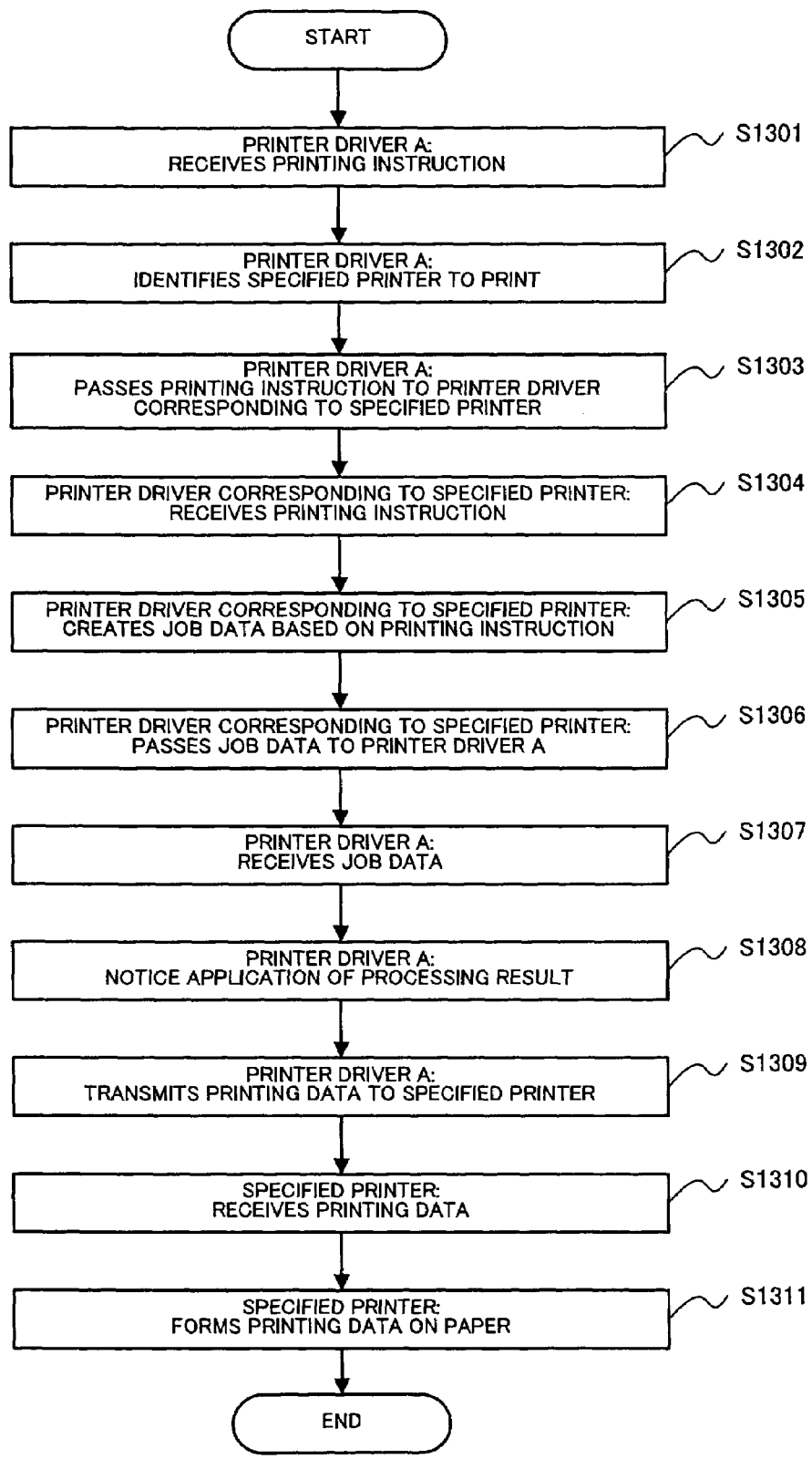
FIG. 13 is a flow chart illustrating the procedure for printing processing which is carried out by the printer driver A, 10, and the printer driver corresponding to the specified printer enter, and the printer when the information processing device 2 which has ended the procedure for driver file acquisition processing in the flowchart as shown in FIG. 12 requests printing of the specified printer.

Next, the procedure for printing processing which is carried out by the printer driver A, 10, and the printer driver corresponding to the specified printer enter, and the printer when the information processing device 2 which has ended the procedure for driver file acquisition processing in the flowchart as shown in FIG. 12 requests printing of the specified printer will be described with reference to the flow chart as shown in FIG. 13.

The printer driver A receives the printing instruction (at step S1301), the printer driver A identifies the specified printer to print, and the printer driver A passes the printing instruction to the printer driver corresponding to the specified printer (at step S1303).

The printer driver corresponding to the specified printer receives the printing instruction (at step S1304), the printer driver corresponding to the specified printer creates job data on the basis of the printing instruction (at step S1305), and the printer driver corresponding to the specified printer passes the job data to the printer driver A (at step S1306).

The printer driver A receives the job data (at step S1307), the printer driver A notifies the application of the processing result (at step S1308), and the printer driver A transmits the printing data to the specified printer (at step S1309).

The specified printer receives the printing data (at step S1310), and the specified printer forms the printing data on a paper (at step S1311), ending the procedure for printing processing.

The present invention need not be limited to the scheme where the driver file is requested of the selected printer as with the embodiment described above, but, may be embodied, for example, in the scheme where the driver file is requested of all the printers (printer X, 301, printer Y, 302, printer Z, 303).

Further, the present invention need not be limited to the scheme where, when the information processing device 2 is connected to the network, the printer driver A, 10, according to the present invention acquires the driver file from the printer on the network 31 as with the embodiment described above, but may be embodied in the scheme where, when the information processing device 2 requests printing of the printer on the network 31, the printer driver A, 10, according to the present invention acquires the driver file from the specified printer to print.

For the way of handling the respective printer drivers after the printing processing, the scheme where the respective driver files are stored and held after the printing processing, and the driver file for the respective printer drivers is not requested of the respective printers may be applied; the scheme where the driver file for the respective printer drivers is deleted after the printing processing, and every time the respective printers is requested to carry out printing, the driver file for the respective printer drivers is requested thereof may be applied; and the scheme where, after the driver file for the respective printer drivers having been acquired, the printer driver A, 10, and the respective printer drivers are synthesized may be applied.

In addition, the present invention is not limited to the configuration where the printer driver A, 10, is installed in the information processing device 2 as with the above described embodiment, but may be embodied in the configuration where the information processing device 2 incorporates or connects to a peripheral equipment control device having the same capability as that of the printer driver A, 10, as described above.

Next, a group of driver files which constitute the printer driver A, 10, will be described. The printer driver A, 10, installed in the information processing device 2 is in the state where the printer 3 which is to be the actual destination is not yet determined, and can be used with any model (in other words, it meets the specifications common to all the models), and hereafter, the printer driver A, 10, in such a state is called the universal driver.

Figure 14:
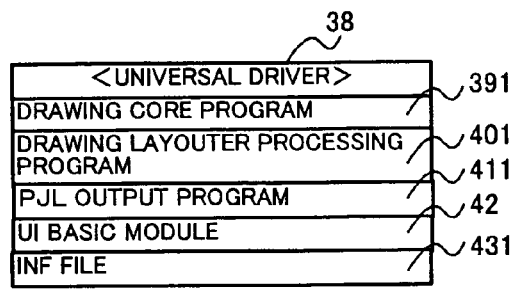
FIG. 14 is a chart giving an example of composition of a universal driver 38.

FIG. 14 is a chart giving an example of composition of a universal driver 38.

As shown in FIG. 14, the universal driver 38 comprises a drawing core program 391, a drawing layouter processing program 401, a PJL output program 411, a UI basic module 42, and an Inf file 431.

The drawing core program 391 carries out processing for negotiation with the OS and the application.

The drawing layouter processing program 401 carries out processing for page layout and scaling in accordance with the value of Devmode.

The PJL output program 411 carries out processing for printer JOB language output.

The UI basic module 42 provides a program which carries out processing for displaying the basic printer driver UI. Specifically, the UI basic module 42 carries out defining the UI component for the respective functions which are achieved by the printer 3 (for example, the "paper size selection function" is displayed with a Combobox), defining the Devmode for the respective functions (in other words, determining which parameter the value selected with a particular function is to be assigned to), and the like.

The Devmode refers to the parameter for carrying out exchange of values between the printer driver defined with the OS, and the application.

With this UI basic module 42, the functions which are required to be notified to the application are supported, and the basic Devmode (the Devmode which is commonly used with all the printers) for the Devmode is supported.

The above-mentioned drawing core program 391, drawing layouter processing program 401, PJL output program 411, and the UI basic module 42 are described as the Inf file 431.

Next, the composition of the printer dependent file which is stored in the printer 3 will be described in detail.

Figure 15:
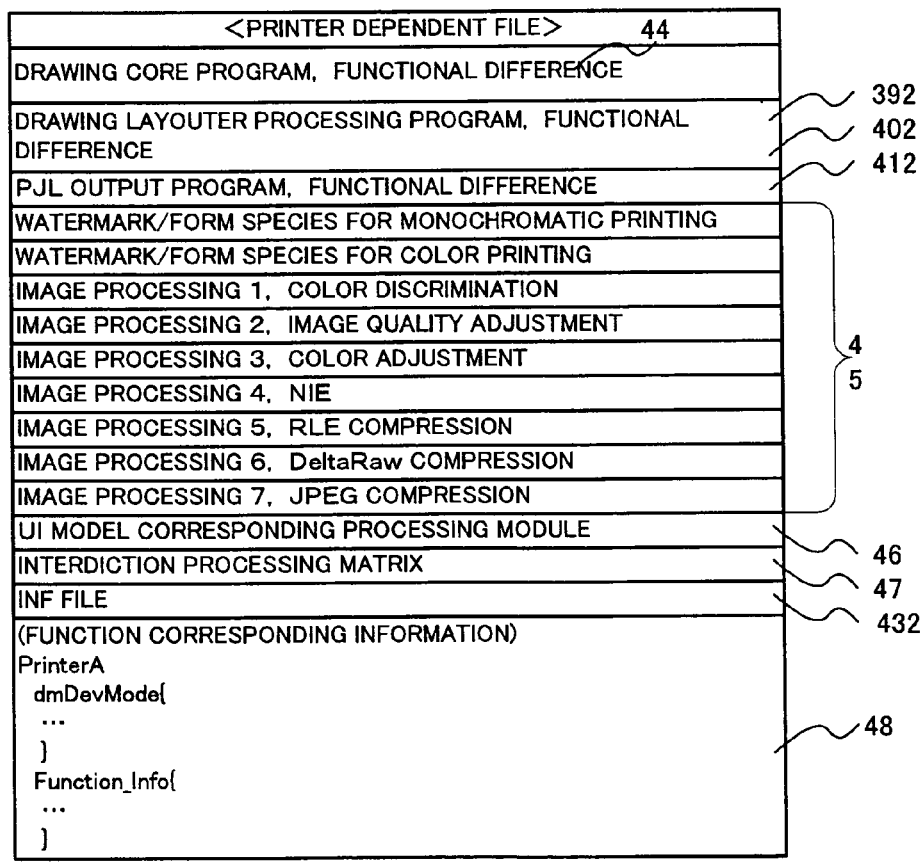
FIG. 15 is a chart giving an example of composition of a printer dependent file 44.

FIG. 15 is a chart giving an example of composition of a printer dependent file 44.

As shown in FIG. 15, the printer dependent file 44 is composed of a drawing core program added function difference file 392, a drawing layouter processing program added function difference file 402, a PJL output program added function difference file 412, object-oriented components for image processing and the like (watermark/form species for monochromatic printing, watermark/form species for color printing, color discrimination, image quality adjustment, color adjustment, NIE, RLE compression, DeltaRaw compression, JPEG compression) 45, a UI model corresponding processing module 46, an interdiction processing matrix 47, an Inf file 432, and a function corresponding information 48.

The drawing core program added function difference file 392, the drawing layouter processing program added function difference file 402, and the PJL output program added function difference file 412 are a portion of the program for functional processing that varies depending upon the model, and the name varies depending upon the model.

For example, as added functions of the drawing core program 391, the Font function (printer Font/TT font) and the like are available; as added functions of the drawing layouter processing program 401, the function of enlarging image and printing on separate sheets of paper, the repetitive printing of image on a sheet of paper, the making booklet, and the like are available; and as added functions of the PJL output program 411, the ProofPrint, SavedPrint, SecurePrint, and the like are available.

These difference files are copied into the system folder in the PC 2 at the initial printing execution or on the UI opening, and the file names are registered to the registry at the same time. Thereafter, by using these registry registered names, the difference files are invoked as a processing routine from the universal driver 38.

The object-oriented components for image processing and the like 45 are object-oriented processing modules for image processing such as compression or color conversion.

The object-oriented components for image processing and the like 45 are invoked from the difference file. In other words, the module names which are invoked for each particular processing are hard coded in the difference file.

The object-oriented components for image processing and the like 45 can be commonly used among models, thus the scheme where they are stored in an external device on the network 31, and are downloaded as required may be applied.

The UI model corresponding processing module 46 is provided with a description of the UI resource or a special control, and contains a UI display bit map which is created for each particular printer 3.

The UI model corresponding processing module 46 is copied into the system folder in the information processing device 2 at the initial printing execution or on the UI opening, and the file name is registered to the registry at the same time. Thereafter, by using this registry registered name, the UI model corresponding processing module 46 is invoked as a processing routine from the universal driver 38.

The interdiction processing matrix 47 is a file in which the interdiction conditions for each particular model are described, and is processed in synchronism with the UI model corresponding processing module 46.

The Inf file 432, which is correspondent to a particular model, is a file different from the Inf file 431 in the universal driver 38. In the PnP (plug and play) installation, this Inf file 432 is referenced.

The function corresponding information 48 provides binary data of a chart of the functions and the choices which are supported by the printer in which it is stored.

The function corresponding information 48 is composed of a Devmode structure and a function information structure FunctionInfo.

The Devmode structure provides the object model initial value (the information for determining the value of Devmode that is required in the printing execution) for the Devmode.

The function information structure FunctionInfo is a structure having a fixed length of byte data (the choices information required in the UI display) for each particular function.

Next, a function information structure FunctionInfo 49 will be described in detail.

FIG. 16 is a chart giving an example of the function information structure FunctionInfo 49.

As shown in FIG. 16, the function information structure FunctionInfo 49 is composed of a single Function_Info structure for a single control, and a plurality of SELECT_ITEM structures subordinate thereto (which number is equal to that expressed by wItemNum of the Function_Info structure).

Here is a specific example. For a model having a sorter bin and a large-capacity copy tray, the Function_Info structure will be:
   strFuncName←"Delivery destination"
   wSelMethod←Combobox
   wItemNum←5

The five SELECT_ITEM structures subordinate to this Function_Info structure will be:
   SELECT_ITEM structure 1 {strItemname←"standard", idDevmode←dmOutput, dwvalue←1}
   SELECT_ITEM structure 2 {strItemname←"sorter bin 1", idDevmode←dmOutput, dwvalue←3}
   SELECT_ITEM structure 3 {strItemname←"sorterbin2", idDevmode←dmOutput, dwvalue←4}
   SELECT_ITEM structure 4 {strItemname←"sorter bin 3", idDevmode←dmOutput, dwValue←5}
   SELECT_ITEM structure 5 {strItemname←"large-capacity copy tray", idDevmode←dmOutput, dwValue←9}

For a model having the stapling and pamphleting functions, the Function_Info structure will be:
   strFuncName←"finishing"
   wSelMethod←Combobox
   wItemNum←3

The three SELECT_ITEM structures subordinate to this Function_Info structure will be:
   SELECT_ITEM structure 1 {strItemName←"none", idDevmode←dmFinish, dwvalue←0}
   SELECT_ITEM structure 2 {strItemName←"staple", idDevmode←dmFinish, dwvalue←1}
   SELECT_ITEM structure 3 {strItemName←"pamphleting", idDevmode←dmFinish, dwvalue←2}

The location where the function corresponding information 48 is held may be the same as that for the printer dependent file 44, or different from that for the printer dependent file 44 (for example, a memory on the printer 3 or an external device on the network 31). In such case, the automatic updating may be implemented by acquiring the time stamp or the like for the different holding location to compare it with the time stamp or the like for the function corresponding information in the printer driver.

The value of Devmode at the initial install (printer non-dependent install) of the universal driver 38 must be an appropriate provisional setting value. The provisional setting value is not actually used, thus may be any value, however, it is realistic to adopt a value actually used. The provisional setting value is registered to the OS through the same processing as that for the conventional prescribed value of Devmode for the printer 3 at the initial install, and it is assumed that the version at this time is "1.00".

Figure 17:
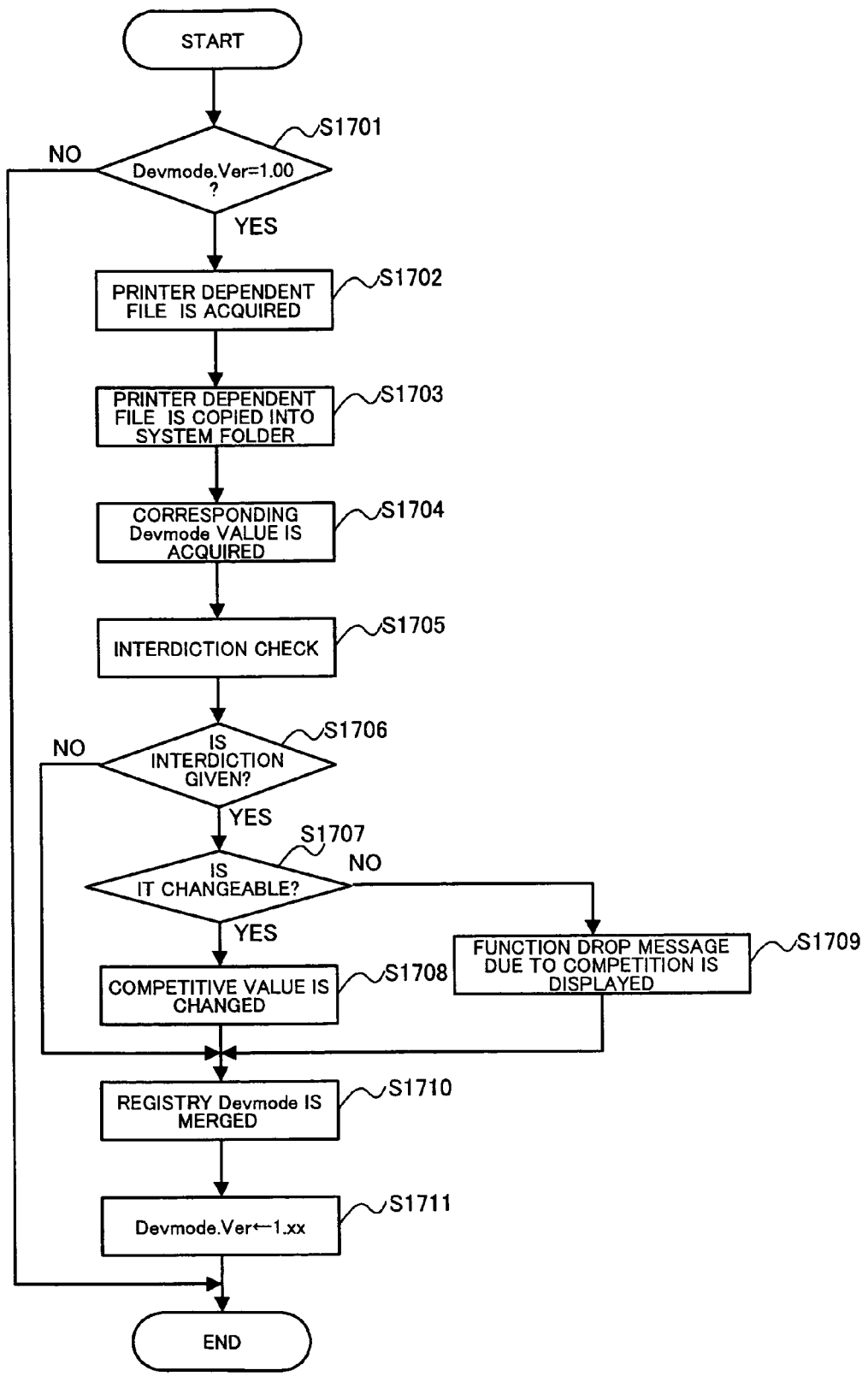
FIG. 17 is a flow chart illustrating the processing which is carried out by the universal driver 38 when the printing instruction is received without the UI being opened (when the test page is printed, or when the printing pushbutton is depressed or the key operation "Ctl+P" is made for performing printing without the UI being opened)

The processing which is carried out by the universal driver 38 when the printing instruction is received without the UI being opened (when the test page is printed, or when the printing pushbutton is depressed or the key operation "Ctl+P" is made for performing printing without the UI being opened) will be described with reference to the flow chart as shown in FIG. 17.

The version of Devmode invoked in printing is checked (at step S1701).

When the version is not 1.00 (NO at step S1701), the processing is ended.

When the version is 1.00 (YES at step S1701), the printer dependent file is acquired from the printer (at step S1702).

The name of the printer dependent file 44 varies depending upon the model. For example, the drawing core program added function difference file 392 is named "AddCore.dll"; the drawing layouter processing program added function difference file 402 named "AddLay.dll"; and the PJL output program added function difference file 412 named "AddPJL.dll", and these are initially registered to the universal driver 38.

By registering these file names to the registry when the printer dependent file 44 is acquired, and programming such that the names initially registered to the universal driver 10 are invoked, the printer dependent file 44 acquired from the printer can be used as a processing module.

For a model with which the printer 3 corresponds to the NetworkMIB or the like, the scheme where the optional configuration of the printer 3 is acquired simultaneously with the printer dependent file 44 being acquired from the printer 3 may be applied. However, with the Devmode acquired from the function corresponding information 48, no interdiction will occur, but when the optional configuration acquired from of the printer 3 is not in the supposed state, or when the function corresponding information 48 has been changed due to updating or the like, an interdiction may occur.

The printer dependent file acquired is copied into the system folder (at step S1703), the corresponding Devmode value is acquired (at step S1704), and interdiction checking is made (at step S1705).

When no interdiction is given (NO at step S1706), the program proceeds to the step S510.

When an interdiction is given (YES at step S1706), whether or not the alteration is possible is checked (at step S1707).

When the alteration is possible (YES at step S1707), the competitive value is altered (at step S1708).

When the alteration is not possible (NO at step S1707), the function drop message due to the competition is displayed (at step S1709).

The registry Devmode is merged (at step S1710).

By registering the added function difference file and merging the registry Devmode, the prescribed value for the corresponding model driver is determined.

The version is altered into 1.xx (at step S1711), the process being ended.

Then, at the activation of the printer driver, the drawing core program added function difference file 392 "AddCore.dll" is loaded. This name is fixed, and is hard coded in the universal driver 38.

Because the contents of the difference file varies depending upon the model, the object-oriented components for image processing and the like 45 are further loaded depending upon the model configuration or the function.

The processing which is carried out by the universal driver 38 when the UI is opened (when the UI is opened from the printer property, or when the setting screen for the printer 3 is opened from the printing menu for the application is opened) will be described in detail. If the prescribed registry key has not been created at the time when the UI opening is instructed, the UI opening is regarded as the initial one.

When the prescribed value of Devmode has already been established (the version is not 1.00) (for example, when the printing has been carried out for test print or the like), the Function_Info structure is acquired from the printer 3, and when the Function_Info structure is successfully acquired, the prescribed registry key is created, and the acquired Function_Info structure is stored. At the UI display, the UI information is configured in the memory region in accordance with the Function_Info structure.

When the prescribed value of Devmode is not established (the version is 1.00) (when the printing has not yet been carried out, and the UI is opened for the first time), the processing as given in the flow chart as shown in FIG. 17 is implemented to acquire the prescribed value of Devmode, the Function_Info structure is acquired from the printer 3, and when the Function_Info structure is successfully acquired, the prescribed registry key is created, and the acquired Function_Info structure is stored. At the UI display, the UI information is configured in the memory region in accordance with the Function_Info structure.

Figure 18:
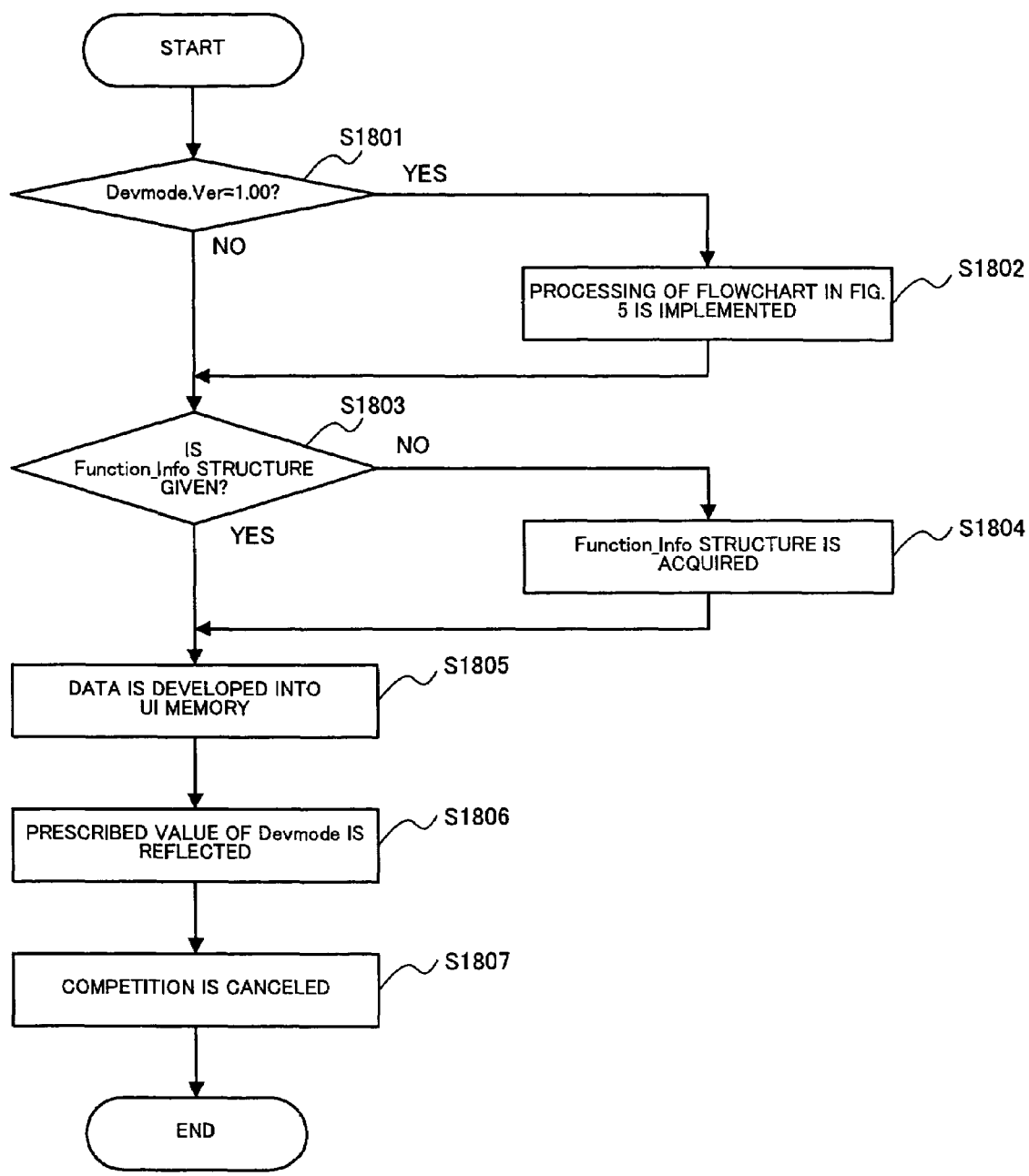
FIG. 18 is a flow chart illustrating the processing which is carried out by the universal driver 38 when the UI is opened.

Next, the processing which is carried out by the universal driver 38 when the UI is opened will be described with reference to the flow chart as shown in FIG. 18.

The version of Devmode is checked (at step S1801).

When the version is not 1.00 (NO at step S1801), the program proceeds to the step 1803.

When the version is 1.00 (YES at step S1801), the processing as given in the flow chart as shown in FIG. 17 is implemented to acquire the prescribed value of Devmode (at step S1802).

The program checks whether or not the Function_Info structure is given (at step S1803).

When the Function_Info structure is given, the program proceeds to the step S1805.

When the Function_Info structure is not given (NO at step S1803), the Function_Info structure is acquired from the printer (at step S1804).

The data is developed in the UI memory (at step S1805), the prescribed value of Devmode is reflected (at step S1806), and when an interdiction occurs in the prescribed value of Devmode, the competition is cancelled (at step S1807), the processing being ended.

In the UI display processing, the UI can be provided for each particular model from the UI basic module 42 by fixing the name of the UI model corresponding processing module 46 and changing the contents depending upon the model. Further, by including the machine bit map and the like, the UI display bit map can be changed depending upon the connected model.

The prescribed value of Devmode is established, and by storing the Function_Info structure acquired from the printer 3, the universal driver 38 is registered to the OS as a printer driver dependent upon the printer driver 3.

Next, the function corresponding information 48 will be described in detail.

FIG. 19 is a chart giving an example of the function corresponding information 48.

As shown in FIG. 19, the function corresponding information 48 is provided with a description of whether or not support is given for a particular function and the choices corresponding to the pertinent function in the printer 3 (Printer A, for example).

The "corresponding Devmode" denotes the Devmode corresponding to a particular function name, and the "component" denotes the component corresponding to a particular choice name. The component "B1" denotes the drawing core; the component "B2" denotes the drawing layouter processing; the component "B3" denotes the PDL output; the component "B4" denotes the watermark/form species for monochromatic printing; the component "B5" denotes the watermark/form species for color printing; the component "C1" denotes the color discrimination; the component "C2" denotes the image quality adjustment; the component "C3" denotes the color adjustment; the component "C4" denotes the NIE; the component "C5" denotes the RLE compression; the component "C6" denotes the DeltaRaw compression; and the component "C7" denotes the JPEG.

Next, the function interdiction processing matrix 47 will be described in detail.

FIG. 20 is a chart giving an example of the main rule interdiction processing matrix 47.

As shown in FIG. 20, the main rule interdiction processing matrix 47 gives competitive data ("X" is given for interdiction) for a particular function name and the choice names for the pertinent function name.

For example, for the choice name "A3" corresponding to the function name "document size", the choice name "same as document size" corresponding to the function name "output size" is an interdiction, and for the choice name "tray 1" corresponding to the function name "paper tray selection", the choice name "user defined size" corresponding to the function name "document size", and the choice names "OHP film", "thick paper", "coated paper", "label paper", "postcard", and "envelope" corresponding to the function name "types of paper" are interdictions.

Therefore, when the "A3" is selected for the function name "document size", the UI basic module 42 dims out the choice name "same as document size" corresponding to the function name "output size" by gray indication or the like, and when the "tray 1" is selected for the function name "paper tray selection", the UI basic module 42 dims out the choice name "user defined size" corresponding to the function name "document size", and the choice names "OHP film", "thick paper", "coated paper", "label paper", "postcard", and "envelope" corresponding to the function name "types of paper" by gray indication, or otherwise changes the indications.

FIG. 21 is a chart giving an example of the graphics interdiction processing matrix 47.

As shown in FIG. 21, the graphics interdiction processing matrix 47 gives competitive data ("X" is given for interdiction) for a particular function name and the choice names for the pertinent function name.

The printer driver to be registered to the OS need not be an overwriting on the universal driver 38, but can be registered as an independent icon. In such case, with a single universal driver 38, a plurality of printer icons can be automatically created in correspondence to a plurality of models of printer 3 on the network 31.

If the function corresponding information 48 is requested of the printer 3 every time the printing is carried out, the load on the network 31 may be increased or the printing performance be deteriorated. Then, the requesting timing can be conditioned, and an appropriate one of the following cases can be selected.

1. Only one time at initial printing.
2. When a definite period of time has elapsed from the previous acquisition of the function corresponding information 48.
3. When a request for information renewal is received from the printer 3.
4. When an information renewal request is issued at the UI.

Case 1: When the function corresponding information 48 is registered as the printer driver of the printer name on the OS for the information processing device 2, no information request is issued. When the printer driver name is overwritten as the universal driver 38 with no change, and the added function difference files are given, no information request is issued, or the information acquisition ending key is registered to the registry.

Case 2: At the completion of the information acquisition, the time stamp of the last history is registered to the register or the like. When a time stamp registration is given, the current time is compared with the time stamp at the timing of opening the printer driver UI, and if the time has elapsed over the prescribed period of time, the information acquisition request is issued to the printer.

Case 3: When a particular loaded optional is changed or a consumable (such as a toner cartridge) is replaced, the program on the printer transmits an information request command to the PC. On the reception thereof, the printer driver issues an information acquisition request to the printer.

Case 4: When the printer driver UI is provided with a driver updating pushbutton or any other appropriate unit that instruction from the user, such instruction means is employed to issue an information acquisition request.

What is claimed is:

1. A peripheral equipment driver stored in an information processing device which is connected to at least one peripheral equipment through a network, and controlling the peripheral equipment, wherein a basic program that meets specifications common to all peripheral equipment is provided, and a computer carries out:

processing for acquiring a peripheral equipment dependent file comprising a difference program to be added to the basic program held by the peripheral equipment to be connected; a function program corresponding to the function to be supported by the peripheral equipment; and data and a program which are dependent on the peripheral equipment, from the peripheral equipment;

processing for adding the acquired peripheral equipment dependent file to the basic program;

processing for registering the basic program to which the peripheral equipment dependent file is added, to the information processing device, as a program which is dependent on the peripheral equipment, wherein the data which is dependent on the peripheral equipment is function corresponding information which describes whether a support which corresponds to the function is provided or not, the program which is dependent on the peripheral equipment is a function corresponding processing program which constitutes a user interface specific to the peripheral equipment on the basis of the function corresponding information, a computer carries out processing for displaying the user interface which is constituted by the function corresponding processing program, on a display device by means of the basic program to which the peripheral equipment dependent file is added, and wherein the computer carries out processing for acquiring function interdiction processing information which describes interdictions for operational competition occurring between the functions held by the peripheral equipment to be connected, from the peripheral equipment; and processing for canceling the competition occurring between the functions displayed on the user interface on the basis of the acquired function interdiction processing information.

2. The peripheral equipment driver of claim 1, wherein the computer carries out processing for activating the function program by means of the difference program.

3. The peripheral equipment driver of claim 1, wherein, when the peripheral equipment is requested to carry out processing without the user interface being displayed on the display device, the computer carries out processing for identifying the function which is supported by the peripheral equipment, on the basis of the function corresponding information; and processing for activating the function program by means of the difference program in accordance with the identification.

4. The peripheral equipment driver of claim 1, wherein, when the function program is stored in a storage device on the network, the computer carries out processing for acquiring the peripheral equipment dependent file from the peripheral equipment, and acquiring the function program from the storage device.

5. A peripheral equipment control device which controls at least one peripheral equipment on a network, wherein a basic program that meets specifications common to all peripheral equipment is provided;

a peripheral equipment dependent file comprising a difference program to be added to the basic program held by the peripheral equipment to be connected; a function program corresponding to the function to be supported by the peripheral equipment; and data and a program which are dependent on the peripheral equipment are acquired from the peripheral equipment;

the acquired peripheral equipment dependent file is added to the basic program;

the basic program to which the peripheral equipment dependent file is added is registered to the information processing device, as a program which is dependent on the peripheral equipment, wherein the data which is dependent on the peripheral equipment is function corresponding information which describes whether a support which corresponds to the function is provided or not, the program which is dependent on the peripheral equipment is a function corresponding processing program which constitutes a user interface specific to the peripheral equipment on the basis of the function corresponding information, the user interface which is constituted by the function corresponding processing program is displayed on a display device by means of the basic program to which the peripheral equipment dependent file is added, and wherein function interdiction processing information which describes interdictions for operational competition occurring between the functions held by the peripheral equipment to be connected is acquired from the peripheral equipment; and the competition occurring between the functions displayed on the user interface on the basis of the acquired function interdiction processing information is cancelled.

6. The peripheral equipment control device of claim 5, wherein the function program is activated by means of the difference program.

7. The peripheral equipment control device of claim 5, wherein, when the peripheral equipment is requested to carry out processing process without the user interface being displayed on the display device, the function which is supported by the peripheral equipment is identified on the basis of the function corresponding information; and the function program is activated by means of the difference program in accordance with the identification.

8. The peripheral equipment control device of claim 5, wherein, when the function program is stored in a storage device on the network, the peripheral equipment dependent file is acquired from the peripheral equipment, and the function program is acquired from the storage device.

9. A method for installing a peripheral equipment driver stored in an information processing device which is connected to at least one peripheral equipment through a network, and controlling the peripheral equipment, comprising:

holding a basic program that meets specifications common to all peripheral equipment;

acquiring a peripheral equipment dependent file comprising a difference program to be added to the basic program held by the peripheral equipment to be connected; a function program corresponding to the function to be supported by the peripheral equipment; and data and a program which are dependent on the peripheral equipment from the peripheral equipment;

adding the acquired peripheral equipment dependent file to the basic program;

registering the basic program to which the peripheral equipment dependent file is added to the information processing device, as a program which is dependent on the peripheral equipment, wherein the data which is dependent on the peripheral equipment is function corresponding information which describes whether a support which corresponds to the function is provided or not, the program which is dependent on the peripheral equipment is a function corresponding processing program which constitutes a user interface specific to the peripheral equipment on the basis of the function corresponding information, the user interface which is constituted by the function corresponding processing program is displayed on a display device by means of the basic program to which the peripheral equipment dependent file is added, and wherein function interdiction processing information which describes interdictions for operational competition occurring between the functions held by the peripheral equipment to be connected is acquired from the peripheral equipment; and the competition occurring between the functions displayed on the user interface on the basis of the acquired function interdiction processing information is cancelled.

10. The method for installing a peripheral equipment driver of claim 9, wherein the function program is activated by means of the difference program.

11. The method for installing a peripheral equipment driver of claim 9, wherein, when the peripheral equipment is requested to carry out processing process without the user interface being displayed on the display device, the function which is supported by the peripheral equipment is identified on the basis of the function corresponding information; and the function program is activated by means of the difference program in accordance with the identification.

12. The method for installing a peripheral equipment driver of claim 9, wherein, when the function program is stored in a storage device on the network, the peripheral equipment dependent file is acquired from the peripheral equipment, and the function program is acquired from the storage device.

* * * * *